(12) United States Patent
Bar-El et al.

(10) Patent No.: US 9,705,673 B2
(45) Date of Patent: *Jul. 11, 2017

(54) METHOD, DEVICE, AND SYSTEM OF PROVISIONING CRYPTOGRAPHIC DATA TO ELECTRONIC DEVICES

(71) Applicant: ARM Technologies Israel Ltd., Kfar Netter (IL)

(72) Inventors: Hagai Bar-El, Rehovot (IL); Alexander Klimov, Hadera (IL); Asaf Shen, Palo Alto, CA (US)

(73) Assignee: ARM Technologies Israel Ltd., Kfar Netter (IL)

( * ) Notice: Subject to any disclaimer, the term of this patent is extended or adjusted under 35 U.S.C. 154(b) by 25 days.

This patent is subject to a terminal disclaimer.

(21) Appl. No.: 14/859,364

(22) Filed: Sep. 21, 2015

(65) Prior Publication Data

US 2017/0063537 A1    Mar. 2, 2017

Related U.S. Application Data

(63) Continuation of application No. 14/187,275, filed on Feb. 23, 2014, now Pat. No. 9,231,758, which is a
(Continued)

(51) Int. Cl.
*H04L 29/06*    (2006.01)
*H04L 9/08*     (2006.01)

(52) U.S. Cl.
CPC .............. *H04L 9/083* (2013.01); *H04L 9/088* (2013.01); *H04L 9/0877* (2013.01); *H04L 63/062* (2013.01)

(58) Field of Classification Search
CPC .............................. H04L 9/083; H04L 63/062
See application file for complete search history.

(56) References Cited

U.S. PATENT DOCUMENTS

| 6,937,726 B1 | 8/2005 | Wang |
| 7,181,620 B1 | 2/2007 | Hur |

(Continued)

OTHER PUBLICATIONS

Abdalla, M.; Kiltz, E.; Neven, G.; "Generalised key delegation for hierarchical identity-based encryption", Information Security, IET, vol. 2, Issue 3, Sep. 2008, pp. 67-78.
(Continued)

*Primary Examiner* — Victor Lesniewski
(74) *Attorney, Agent, or Firm* — Eitan, Mehulal & Sadot

(57) ABSTRACT

System, device, and method of provisioning cryptographic assets to electronic devices. A delegation message is generated at a first provisioning server. The delegation message indicates provisioning rights that are delegated by the first provisioning server to a second provisioning server with regard to subsequent provisioning of cryptographic assets to an electronic device. The delegation message includes an association key unknown to the first provisioning server, encrypted using a public key of the electronic device. The delegation message further includes a public key of the second provisioning server. The electronic device locally generates the association key, which is unknown to the first provisioning server. The delegation message is delivered to the electronic device. Based on the delegation message, cryptographic assets are provisioned by the second provisioning server to the electronic device, using the association key.

6 Claims, 11 Drawing Sheets

Related U.S. Application Data continuation-in-part of application No. 12/947,381, filed on Dec. 9, 2010, now Pat. No. 8,687,813.

(60) Provisional application No. 61/272,890, filed on Nov. 16, 2009.

(56) References Cited

U.S. PATENT DOCUMENTS

| | | | |
|---|---|---|---|
| 7,213,005 B2 | 5/2007 | Mourad et al. | |
| 7,260,224 B1 | 8/2007 | Ingle et al. | |
| 7,380,120 B1 | 5/2008 | Garcia | |
| 7,516,321 B2 | 4/2009 | Chen et al. | |
| 7,660,421 B2 | 2/2010 | Hopkins et al. | |
| 7,774,279 B2 | 8/2010 | Wang et al. | |
| 7,779,258 B2 | 8/2010 | Arnold et al. | |
| 7,779,455 B2 | 8/2010 | Abellan Sevilla | |
| 7,873,168 B2 | 1/2011 | Tateoka et al. | |
| 7,908,474 B2 | 3/2011 | Arnold et al. | |
| 7,920,706 B2 | 4/2011 | Asokan et al. | |
| 8,098,827 B2 | 1/2012 | Okaue | |
| 8,145,900 B2 | 3/2012 | Launchbury et al. | |
| 8,332,633 B2 | 12/2012 | Raike | |
| RE43,906 E | 1/2013 | Garcia | |
| 8,374,354 B2 | 2/2013 | Berggren | |
| 8,396,222 B2 | 3/2013 | Solow et al. | |
| 8,437,476 B2 | 5/2013 | Agagliate et al. | |
| 2002/0025045 A1 | 2/2002 | Raike | |
| 2002/0031222 A1 | 3/2002 | Buchheit et al. | |
| 2002/0126850 A1 | 9/2002 | Allen et al. | |
| 2003/0016829 A1 | 1/2003 | Chu | |
| 2003/0018913 A1 | 1/2003 | Brezak et al. | |
| 2003/0172280 A1 | 9/2003 | Scheidt et al. | |
| 2003/0229789 A1* | 12/2003 | Morais | H04L 9/083 713/171 |
| 2004/0001595 A1 | 1/2004 | Hopkins et al. | |
| 2004/0255130 A1 | 12/2004 | Henry et al. | |
| 2005/0091171 A1* | 4/2005 | Grobman | G06Q 20/382 705/64 |
| 2005/0149924 A1 | 7/2005 | Komarla et al. | |
| 2006/0053285 A1 | 3/2006 | Kimmel et al. | |
| 2007/0006291 A1* | 1/2007 | Barari | G06F 21/335 726/10 |
| 2007/0098178 A1* | 5/2007 | Raikar | H04L 63/062 380/282 |
| 2007/0248232 A1 | 10/2007 | Driscoll et al. | |
| 2008/0123863 A1 | 5/2008 | Bade et al. | |
| 2008/0175393 A1 | 7/2008 | Oba et al. | |
| 2008/0212783 A1 | 9/2008 | Oba | |
| 2008/0263370 A1 | 10/2008 | Hammoutene et al. | |
| 2009/0136028 A1 | 5/2009 | Card, II | |
| 2009/0204808 A1 | 8/2009 | Guo et al. | |
| 2009/0217029 A1* | 8/2009 | Ilac | H04L 9/0822 713/151 |
| 2009/0268902 A1 | 10/2009 | Fascenda et al. | |
| 2010/0189265 A1* | 7/2010 | Ito | H04L 9/0822 380/285 |
| 2011/0078440 A1* | 3/2011 | Feng | G06Q 10/02 713/168 |
| 2011/0154031 A1* | 6/2011 | Banerjee | G06F 21/335 713/165 |
| 2012/0045064 A1* | 2/2012 | Rembarz | H04L 9/0822 380/281 |
| 2012/0284507 A1* | 11/2012 | Bostanci | G06F 21/335 713/155 |
| 2013/0024688 A1* | 1/2013 | Wen | H04L 63/0807 713/168 |
| 2013/0318348 A1 | 11/2013 | Lebron et al. | |
| 2014/0044265 A1 | 2/2014 | Kocher | |
| 2014/0095864 A1 | 4/2014 | Dasgupta et al. | |
| 2014/0122885 A1* | 5/2014 | Wu | H04L 29/06 713/171 |
| 2014/0359755 A1 | 12/2014 | Beitel | |
| 2015/0180652 A1 | 6/2015 | Kocher | |
| 2015/0222604 A1 | 8/2015 | Ylonen | |

OTHER PUBLICATIONS

Fu, Jianqing; Chen, Jian; Fan, Rong; Chen, XiaoPing; Ping, Lingdi; "An efficient delegation-based anonymous authentication protocol", Second International Workshop on Computer Science and Engineering, Oct. 28-30, 2009, pp. 558-562.

Chang, Chin-Chen; Lin, Chu-Hsing; Lee, Wei; Hwang, Pai-Cheng; "Secret Sharing with Access Structures in a Hierarchy", 18th International Conference on Advanced Information Networking and Applications, Mar. 29-31, 2004, vol. 2, pp. 31-34.

International Search Report for application PCT/IB2010/055198 dated Jun. 10, 2011.

\* cited by examiner

METHOD, DEVICE, AND SYSTEM OF PROVISIONING CRYPTOGRAPHIC DATA TO ELECTRONIC DEVICES

CROSS-REFERENCE TO RELATED APPLICATIONS

This application is a continuation of U.S. patent application Ser. No. 14/187,275, filed on Feb. 23, 2014, which is hereby incorporated by reference in its entirety; which is a Continuation-in-Part of U.S. patent application Ser. No. 12/947,381, filed on Nov. 16, 2010, now U.S. Pat. No. 8,687,813, which is hereby incorporated by reference in its entirety; and which claimed priority and benefit from U.S. provisional patent application No. 61/272,890, filed on Nov. 16, 2009, which is hereby incorporated by reference in its entirety

FIELD

The present invention relates to the field of security solutions for electronic devices.

BACKGROUND

Key Provisioning is a problem common to many cryptographic modules. Whenever a cryptographic device is designed to perform operations using internally-stored key material, this key material needs to be available to the cryptographic device.

For most key material, provisioning may be performed by means defined at the application level. Most applications may support methods to securely communicate keys to the participants of their security protocols. Provisioning methods specified by applications may usually rely on pre-existing key material, which may be used to secure a subsequent provisioning process. Other applications may perform provisioning without pre-existing key material, for example, if their threat models allow that.

SUMMARY

The present invention may comprise, for example, systems, devices, and methods of provisioning cryptographic materials, or any other data or data items, to one or more electronic devices. The provisioned cryptographic materials may comprise, for example, security key materials, encryption keys, decryption keys, public keys, private keys, passwords, pass-phrases, Personal Identification Number (PIN), or other data intended to be securely provisioned.

For example, a method of cryptographic material provisioning (CMP) may comprise: (a) generating a delegation message at a first provisioning server, wherein the delegation message indicates provisioning rights that are delegated by the first provisioning server to a second provisioning server with regard to subsequent provisioning of cryptographic assets to an electronic device, wherein generating the delegation message comprises at least one of: (A) inserting into the delegation message an association key unknown to the first provisioning server, encrypted using a public key of said electronic device, wherein said public key of said electronic device is usable to encrypt data for subsequent decrypting by said electronic device using said private encryption key of said electronic device; (B) inserting into the delegation message a public key of the second provisioning server; enabling the electronic device to locally generate said association key unknown to the first provisioning server; wherein the association key is retrievable by the second provisioning server based on the public key of the second provisioning server; (b) delivering the delegation message from the first provisioning server to the electronic device; (c) at the second provisioning server, and based on said delegation message, provisioning one or more cryptographic assets to the electronic device, using said association key.

In some embodiments, the first provisioning server, by listening to all communications among the first provisioning server, the second provisioning server, the electronic device, and an authorization server, cannot decipher the contents of one or more cryptographic assets that are provisioned by the second provisioning server to the electronic device, even though said first provisioning server delegated to said second provisioning server one or more provisioning rights to subsequently provision one or more of said cryptographic assets.

In some embodiments, the first provisioning server, which introduced the second provisioning server to the electronic device for purposes of subsequent provisioning of cryptographic assets, cannot decipher data exchanged between the second provisioning server and the electronic device, even though the second provisioning server and the electronic device did not have any shared secrets and did not have any cryptographic key data usable for secure communication between the second provisioning server and the electronic device prior to said introduction by said first provisioning server.

In some embodiments, the method may comprise: delegating from the first provisioning sever to the second provisioning server, a right to securely send a cryptographic asset from the second provisioning server to the electronic device, wherein the first provisioning server cannot decipher any cryptographic asset that is sent from the second provisioning server to the electronic device.

In some embodiments, generating the delegation message comprises: inserting into the delegation message a public key of the second provisioning server, to enable execution of an identification protocol for subsequent personalized provisioning of a cryptographic asset to said electronic device.

In some embodiments, generating the delegation message comprises: inserting into the delegation message an association key to be used with the second provisioning server, to enable subsequent execution of provisioning of a cryptographic asset to one or more electronic devices using said association key.

In some embodiments, delivering the delegation message to the electronic device is performed via a one-pass one-way communication from the first provisioning server to said electronic device.

In some embodiments, the method may comprise, prior to performing step (a): securely delivering from the second provisioning server to the first provisioning server, via a secure communication channel, (A) a public encryption key of the second provisioning server, and (B) a class-wide association key encrypted with a key that allows the association key to be decrypted by said electronic device.

In some embodiments, the method may comprise: provisioning from the first provisioning server to the electronic device, via a one-pass one-way provisioning protocol, at least: (i) the public encryption key of the second provisioning server, (ii) the server certificate of the second provisioning server, digitally signed by an authorization server; (iii) an indication of which cryptographic assets the second provisioning server is authorized to subsequently provision to the electronic device.

In some embodiments, generating the delegation message comprises: inserting into the delegation message one or more flags indicating to the electronic device whether the second provisioning server is authorized to provision: (X) only personalized cryptographic assets, or (Y) only class-wide cryptographic assets for a class of multiple electronic device, or (Z) both personalized and class-wide cryptographic assets.

In some embodiments, the method may comprise: prior to provisioning a particular cryptographic asset from the second provisioning server to the electronic device, performing: acquiring by the second provisioning server an authorization ticket, from an authorization server, indicating that the second provisioning server is authorized to provision the particular cryptographic asset to said electronic device.

In some embodiments, said acquiring of the authorization ticket is triggered by a flag, indicating that authorization is required for each provisioning event performed by the second provisioning server, the flag located in a server certificate issued by said authorization server to the second provisioning server.

In some embodiments, the acquiring comprises: at the second provisioning server, contacting the authorization server to present to the authorization server (A) a server certificate of the second provisioning server, and (B) a hash of the particular cryptographic asset intended to be provisioned by the second provisioning server to the electronic device.

In some embodiments, the acquiring further comprises: receiving at the second provisioning server, from said authorization server, said authorization ticket which comprises a digital signature by the authorization server on the hash of the particular cryptographic asset intended to be provisioned by the second provisioning server to the electronic device; wherein said digital signature enables said electronic device to verify by the electronic device prior to storing said particular cryptographic asset.

In some embodiments, provisioning the cryptographic asset to the electronic device is performed via a one-pass one-way communication from the second provisioning server to said electronic device.

In some embodiments, a device or apparatus or system for cryptographic material provisioning (CMP) may comprise: a first provisioning server to generate a delegation message, wherein the delegation message indicates provisioning rights that are delegated by the first provisioning server to a second provisioning server with regard to subsequent provisioning of cryptographic assets to an electronic device, wherein the first provisioning server is to generate the delegation message by performing at least one of: (A) inserting into the delegation message an association key unknown to the first provisioning server, encrypted using a public key of said electronic device, wherein said public key of said electronic device is usable to encrypt data for subsequent decrypting by said electronic device using said private encryption key of said electronic device; (B) inserting into the delegation message a public key of the second provisioning server; enabling the electronic device to locally generate said association key unknown to the first provisioning server; wherein the association key is retrievable by the second provisioning server based on the public key of the second provisioning server; wherein the first provisioning server is to cause delivery of the delegation message from the first provisioning server to the electronic device; wherein the second provisioning server is to provision, and based on said delegation message, one or more cryptographic assets to the electronic device, using said association key.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF THE PRESENT INVENTION

Figure 1:
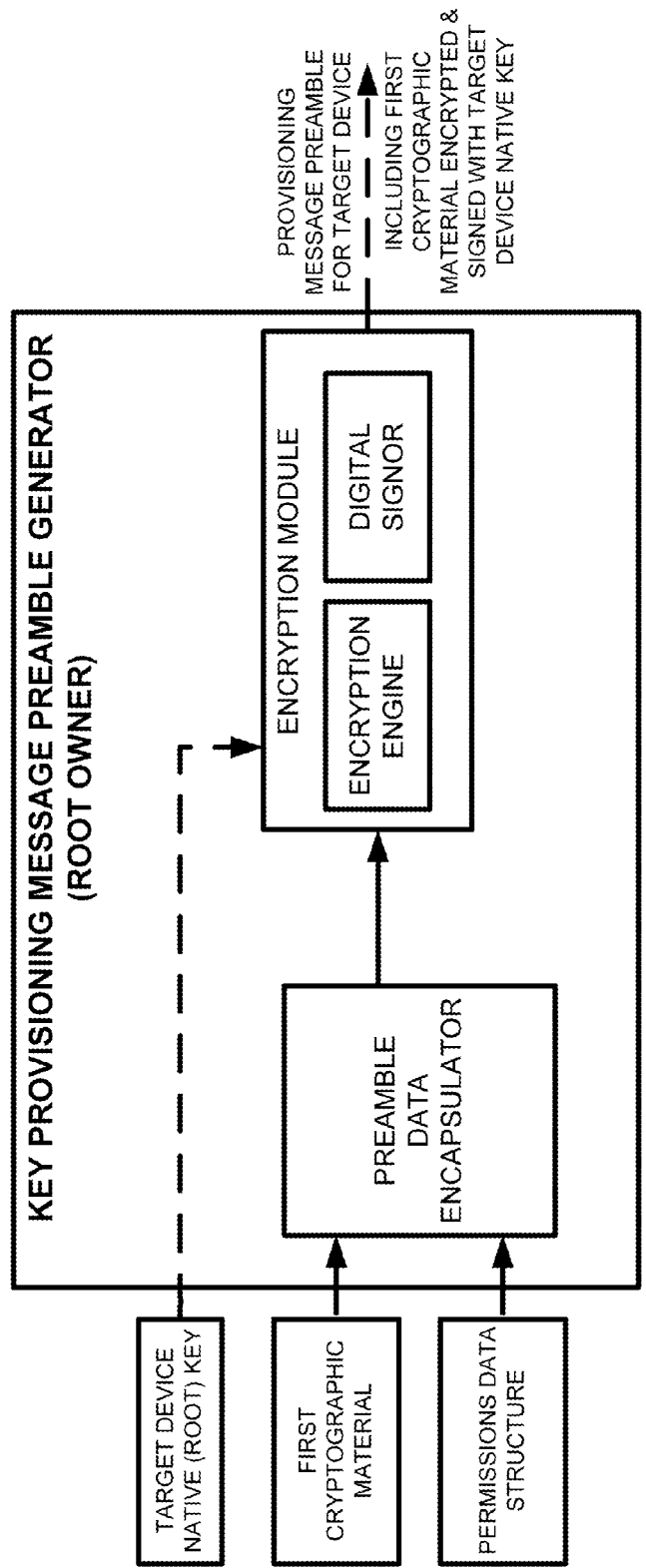
FIG. 1 is a schematic block diagram illustration of a provisioning message preamble generator, which may be used by a target device root owner, in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that in some implementations, the entity that installs key material in an electronic device ("the "Installer"), while operating on behalf of the owner of the device asset (the "Owner"), may not necessarily be entirely trusted by the Owner. The provisioning process, if performed without measures against compromise by the Installer, may require extremely high levels of trust on behalf of the Owner. In some cases, such trust may not be granted, leading to the need to devise a system that protects the provisioning process against compromise also by the Installer.

Applicants have further realized that another source for complexity stems from the possible existence of Sub-owners. A Sub-owner may be an entity which is not the owner of the device asset, but which owns some of the key material to be placed in it. Each Sub-owner may have its own one or more Installer(s). The same trust issue between the Owner and its Installer may similarly exist for each Sub-owner and any of its respective Installer(s). Additionally, partial distrust may exist between the Owner and its Sub-owners. The Owner may trust the Sub-owner to provide its devices with key material, but the Owner may not trust the Sub-owner to overwrite other key material, such as that installed by the Owner or by any other Sub-owner. In many cases, the Owner may not accept the ability of one of its Sub-owners to obtain key material provisioned by another Sub-owner. In other cases, the sub-owner may trust the owner with its secrets.

Applicants have realized that the problem of key provisioning may be stated as the need to: (a) allow Owner to allow Installer (one or more) to provide the device with key material on behalf of the Owner, without exposing the key material to the Installer that performs the physical provisioning operation; (b) allow a similar model for more than one Sub-owner, each having associated with it one or more Installers; (c) prevent any Sub-owner from obtaining key material provisioned by another Sub-owner; (d) allow Owner to control what key material each Sub-owner provisions through its Installers, while not having possession of the provisioned material itself. The client-side of an implemented solution for the problem may fit within the capabilities of an embedded chip-set, and may be adapted to be performed in short times, e.g., during fabrication.

The present invention includes methods, circuits, devices and systems for provisioning of cryptographic material (e.g., cryptographic keys or data to one or more electronic devices. According to embodiments, a provisioning message preamble for a specific target device and/or for a specific group of devices (e.g., specific make and model of cell-phones) may be generated and provided to a party intending to install or otherwise use a functional cryptographic key (i.e., cryptographic material) on the target device. The provisioning message preamble, operating in concert with a Cryptographic Material Provisioning Module (CMP), also referred to as "Key Provisioning System", on the target device, may provide for: (1) a multilevel delegation hierarchy/structure for provisioning cryptographic keys to the target device, such that the native (root) key owner of the device (the part with the highest level of unrestricted rights) may delegate complete or partial key provisioning rights to one or more other parties, and some or all of the other parties may further delegate some or all of their respective rights to other parties along a hierarchical chain whose length and/or count has no predefined limit, (2) partial delegation functionality (e.g., based on key types) such that any member in a provisioning rights delegation hierarchy may define which key provisioning rights its delegate or delegates receive, including the right to further delegate or not, as long as those rights do not exceed the rights of the delegating party.

The provisioning message preamble may be constructed of one or more message portions or segments, and the first portion or segment may be encrypted and/or signed using the target device's native/root key. The first portion of the preamble may include first cryptographic material and a permissions data vector, which vector may include one or more usage restrictions including: (1) what type of keys may be provisioned to the target device by the user of the preamble (e.g., first delegate), and (2) an indication of whether the user of the preamble may convey key provisioning rights or sub-rights further down a rights delegation hierarchy or chain.

In some embodiments, a provisioning message may include a preamble and a payload, such that the preamble may be constructed and utilized in a particular manner in order to indicate or facilitate authorized provisioning and/or delegation of provisioning authorization. In other embodiments, preamble(s) need not be used; and instead, messages may be used in conjunction with suitable protocols (e.g., identification protocol, provisioning protocol, querying protocol) in order to enable provisioning, delegation, and other functionalities as described herein.

The provisioning message preamble (i.e., first portion of the provisioning message) may be configured such that a second provisioning message portion, including cryptographic material (e.g., functional key or keys which are the subject of provisioning), may be appended to the preamble (e.g., by the first delegate) to generate a complete first provisioning message. The second portion of the provisioning message may be encrypted and/or signed by the first cryptographic material (e.g., a first cryptographic key provided by or otherwise known by the first delegate) within the preamble. According to embodiments, a CMP on a target device receiving the complete provisioning message may process the preamble by: (1) decrypting the preamble using the devices native/root key, (2) extracting from the preamble the first cryptographic material and the permissions data vector, (3) decrypting the second portion of the message using the extracted first cryptographic material, (4) extracting a functional key or keys (second cryptographic material) within the second portion, (5) checking the extracted functional key or keys (second cryptographic material) against usage permissions defined in the permissions data vector within the preamble to determine whether the extracted key or keys are of a type permitted for provisioning by the permissions data vector, and (6) provisioning the keys to the target device (installing, storing or otherwise using) if the extracted key type(s) are permitted and the preamble is valid.

According to further embodiments, the second provisioning message portion may include second cryptographic material which is not a functional key (i.e., a key which is the subject of provisioning to the target device), but rather cryptographic data (e.g., key, link to key, etc.) for decrypting and/or authenticating a third portion (e.g., provided by a second delegate) of the provisioning message, which third portion may be appended (e.g., by the second key provisioning delegate) behind the second portion. According to this embodiment, the second portion may also include a second permissions data vector indicating usage limitations of any cryptographic material (e.g., third cryptographic material or key) to be extracted from the third message portion. In this event, when the third portion includes a functional key, the combined first and second portions may collectively be considered the provisioning message preamble, and the third message portion including the functional key (e.g., provisioned by the second delegate) to be the subject of provisioning on the target device may be considered the message body. According to embodiments where the first portion of the preamble is appended by a second portion which also includes cryptographic material and/or a second permissions data vector, the combined cryptographic material and permission data vectors of the first and second portions may be termed a "delegation structure", which delegation structure provides the means (cryptographic material for decrypting) and defines allowable usage (types of keys allowed for provisioning on the target device) for one or more functional cryptographic keys to be provisioned by the second delegate to the target device.

Likewise, a third provisioning message portion may be added by a second delegate with cryptographic material (e.g., key, link to a key, or the like) required for decrypting and/or authenticating a fourth portion of the provisioning message, which fourth portion may be appended (e.g., by a third delegate) behind the third portion. If the fourth portion includes a functional key, the first through third portions of the message may be considered the preamble including the delegation structure required to access and process the functional key of the fourth portion.

It should be understood that such a chain of provisioning message portions, where cryptographic material in one portion may be used to decrypt/authenticate and extract data from the next, has no inherent limitation in count. By providing for portions of a provisioning message to be appended to one another according to the methodology described, a length or size of a provisioning rights delegation chain or hierarchy (i.e., delegation structure) may be indefinite, with each provisioning rights delegate being able to provide sub-rights to a sub-delegate, as long as none of the delegated rights exceed or contradict any usage restrictions (e.g., which types of keys may be installed) found in any of the permissions data vectors of any preceding message portions.

Since data processing at the target device of a provisioning message according to embodiments of the present invention is substantially sequential, according to some embodiments the data processing and/or data processor (e.g., CMP) may be a state-machine. Since data processing at the target device of a provisioning message according to embodiments of the present invention is substantially sequential, according to some embodiments the data processing and/or data processor (e.g., CMP) may not require access to a non-constant amount of memory for storage of cryptographic material within the provisioning message to support an infinite number of delegation levels.

A "Root Key", denoted R, may be the one key in each device that is used as the root trust anchor. This is the first key that may be used when decrypting and authenticating a Provisioning Message. It is the only key material that is assumed to pre-exist in all provisioned devices. It may be facilitated by the means described below. It is noted that in some embodiments, the Root Key (R) may optionally have similar or identical functionality to the ICV Root of Trust that is further described herein, or vice versa The Root Key may either be a single key used in an entire lot (or batch) of devices, or it may be device-specific. Having the Root Key be device-specific may increase security, but may be more difficult to manage and may sometimes be technically infeasible.

The Root Key stored by the device may be made available to the provisioning process requiring it in one of three ways: (a) it may be recalled from Internal Protected Storage, such as EEPROM, or other non-volatile memory, where it was stored as part of a root key provisioning; (b) it may be made available as a hard-coded part of the logic implemented in the device or chip; (c) it may be derived from one or more Root Key Components. The length of the Root Key field (and the key itself) may be 128 bits, 256 bits, 512 bits, 1,024 bits, 2,048 bits, 4,096 bits, or any other suitable length.

Functional Keys may be the subject of provisioning. These may be the pieces of information (e.g., cryptographic material) that may be delivered to the device as part of the provisioning process, and which may be consumed on the device by other processes after the provisioning process concludes. A Functional Key, denoted herein as k, may not necessarily be a cryptographic key. This "functional key" may be an opaque field which may never be interpreted by the CMP. Therefore, it may be a wrapper for any data within reasonable length requirements. Each Functional Key may be a field of a larger structure, which is the Key Structure. The Key Structure may be the object maintained by the CMP which may store the Functional Key and associated metadata.

In a demonstrative implementations, the data which consists of the Key Structure may include: (a) "Key Value", which may be the Functional Key, k; (b) "Key ID", which may be an identifier of the key or structure, which is typically unique; (c) "Key Type", which may be a string representing the Key Type of the Functional Key k; (d) "Key Slot", which may be a string representing the Key Slot of k, within the Key Type.

Each Functional Key that is processed (e.g., received and stored) by the Key Provisioning System, is associated with a Key Type. The key type may be a non-unique string representing the usage, purpose, or application of the key. This property may be provided to Sub-owners as means for control delegation. The Key Type may also be used as part of the key metadata which is read by the application that uses the key, e.g., to determine the usage of the key, or to allow an application to detect its own keys in a repository that contains keys of several applications.

The namespace of a Key Type field may be maintained by an Owner, and possibly by its one or more Sub-owners. In some implementations, the value of Key Type may be a string, which may be processed only by functions of sub-string concatenation and comparison.

As a demonstrative example for the possible uses of the Key Type field, an Owner (and possibly one or more of its respective Sub-owners) may use the following values for Key Type fields: (a) System/Firmware Update/Verification; (b) System/AntiTheft/Attestation; (c) Apps/PaymentApp/Encrypt; (d) Apps/PaymentApp/Sign; (e) Apps/DRM/Scheme1/GroupPrivate; (f) Apps/DRM/Scheme1/ServerParameters A "Key Slot" may be a field which may be provided for distinguishing between keys that have the same Key Type. When more than one key of a given Key Type is provisioned by a Key Provisioning System, each of those keys may have a different Key Slot value in its Key Slot field. The Key Slot values may repeat among keys of different Key Types. The value in a Key Slot may be an integer counter. The value in a Key Slot may be a short string having any suitable value and which may be treated as an opaque value which may be used for comparison purposes.

The combination of values in the Key Type and Key Slot fields may be unique on a target device. However, there may be no requirement for the Key ID field to be unique. It is likely to be unique due to its nature and name, but its uniqueness is not a requirement of the Key Provisioning System. For the Key Provisioning System, the value in Key ID may be an opaque string which is stored so it may be used by client applications.

A Provisioning Structure" may be a data object that is sent in the Provisioning Message. A single Provisioning Message may contain one or more instances of a Provisioning Structure. The client-side of the Key Provisioning System may accept a Provisioning Message from an Installer, and may act based on each Provisioning Structure the message may contain.

Each Provisioning Structure may contain, or may refer to, a single Functional Key that may be processed by the Key Provisioning System. The Provisioning Structure object may consist of two parts: a Preamble and a Body. The Preamble may contain zero or more instances of a Delegation Structure; and the Body may contain the actual command and data necessary for a key provisioning operation. The Provisioning Structure may be regarded as consisting of zero or more instances of Delegation Structures, followed by a Body structure.

The "Delegation Structure" object may be an object designed to communicate from an Owner or a Sub-owner to the Key Provisioning System on the device, its approval to have a target Sub-owner issue the command which appears in the Body object of that Provisioning Structure. The target Sub-owner is not identified in the structure, because there is no naming convention and enforcement for Sub-owners. Rather, the target Sub-owner is referenced by a key it possesses.

The key that the target Sub-owner uses is denoted as $P_i$, with i being an indicator of the position of that Delegation Structure object in the series of such structures in the Provisioning Structure. For example, $P_1$ is the key that is held by the Sub-owner who was delegated with authority to provision keys by Owner, who is holding on to R; while $P_2$ is the key that is held by the Sub-owner who was delegated with authority to provision keys by the Sub-owner that holds $P_1$ above, and so forth.

The Preamble structure of the Provisioning Structure object may contain an ordered set of Delegation Structure objects, introducing $P_1 \ldots P_n$ in order. While a limit on n may be specified by particular implementations of the present invention, the design allows n to be arbitrarily large, e.g., by not linking its value to required system resources other than processing time. For example, a Provisioning Structure causing the insertion of a certain key may start with a Delegation Structure from Owner (holding R) to a Sub-owner $P_1$, allowing it to provision the key, followed by a Delegation Structure created by the Sub-owner $P_1$ to another Sub-owner holding on to $P_2$, allowing this one to provision that key, followed by the actual key insertion command authorized by the Sub-owner $P_2$.

Restricting Delegation by Key Types: Each delegation may be bound to a group of allowed Key Types. Such groups may be described using a Key Type Prefix (Permissions Data Vector). A delegation may apply to one such prefix. Delegation issued for a Key Type Prefix "a" may imply that the target Sub-owner of the delegation controls only the part of the Key Type namespace starting with "a". The owner of R, who is Owner, may control the entire namespace of Key Type.

Each Sub-owner may be able to only delegate with a Key Type Prefix that is a continuation of the Key Type Prefix by which it was itself delegated. For example, a Sub-owner holding on to $P_2$ and who was delegated (by the Sub-owner $P_1$) with the Key Type Prefix "Apps/DRM/Scheme1", can only delegate to the Sub-owner holding on to $P_3$ based on prefixes such as "Apps/DRM/Scheme1/XYTelecom", or even "Apps/DRM/Scheme1" itself, but not, for example, "Apps/MPayment".

The Delegation Structure object may comprise the following fields:

Target Key: a 128-bit (or other) key that is held by the target Sub-owner. This field contains $P_i$ in an encrypted form.

Allowed Type Segment: The Key Type Prefix of the Key Types that are allowed to be processed by the Sub-owner $P_i$.

Delegation Auth: A MAC on the above fields, indicating the approval of the owner of $P_{i-1}$ to delegate the permission to operate on keys of the above Key Type Prefix, to the Sub-owner who is the owner of $P_i$.

The Target Key may contain $P_i$ in an encrypted form. Encryption may be done by AES ECB, with a key that derives from $P_{i-1}$ (or R, if i=1). The encryption key, $K_E$, may be computed in accordance to any known method including those described herein, with a CMAC PRF in accordance to any known methods, including those described below:

$$L = E(P_{i-1}, 0^b) \tag{1}$$

$$K_1 = \begin{cases} L \ll 1 & MSB_1(L) = 0 \\ (L \ll 1) \oplus 0^{120}10000111 & MSB_1(L) \neq 0 \end{cases} \tag{2}$$

$$T = E(P_{i-1}, K_1 \oplus (1^1 \| PROVDENC \| 0 \times 00 \| 0^{47} \| 10^7)) \tag{3}$$

$$K_E = T \tag{4}$$

L may be an encrypted zero block using the effective key, $P_{i-1}$.

$K_1$ may be a sub-key in accordance with any known method and/or those described herein. The method may be built so the encrypted block is exactly 128 bits, so that $K_2$ need not be calculated at all. The tag T, which is the KDF output, may consist of ECB encryption of a "1" bit (indicating rolling block number), a unique constant Label used by this specification for encryption keys, a 47-bit zero string which serves formally as a Context (constant, to achieve key persistence), and informally to pad the structure, and a binary representation of 128, which may be the required key length.

The Target Key field may then be computed as the AES ECB encryption of $P_i$ with the encryption key deriving from $P_{i-1}$, as follows:

$$TARGETKEY = E(K_E, P_i)$$

The value of Allowed Type Segment may be the Key Type Prefix that the Delegation Structure object applies to. The Allowed Type Segment may always be appended in its entirety to the Allowed Key Type derived when processing the earlier Delegation Structure object in the chain, with the Delimiter following it. For example, if the preceding Delegation Structure object caused the current Allowed Type to be -System/Apps-, and the value in Allowed Type Segment is "DRM", then the resulting Allowed Type is -System/Apps/DRM-. The Delimiter, '/', is implicitly appended after every insertion of an Allowed Type Segment value. Notwithstanding, this symbol may be allowed as part of the Allowed Type Segment.

The value of Delegation Auth may be a CBC-MAC computed over $P_i$ and the Allowed Type Segment. The CBC-MAC may be computed using a key that derives from $P_{i-1}$ (or R, if i=1). The MAC key, $K_I$ may be computed in accordance with any known methods and those described herein with a CMAC PRF in accordance with:

$$L = E(P_{i-1}, 0^b) \tag{5}$$

$$K_1 = \begin{cases} L \ll 1 & MSB_1(L) = 0 \\ (L \ll 1) \oplus 0^{120}10000111 & MSB_1(L) \neq 0 \end{cases} \tag{6}$$

$$T = E(P_{i-1}, K_1 \oplus (1^1 \| PROVDMAC \| 0 \times 00 \| 0^{47} \| 10^7)) \tag{7}$$

$$K_I = T \tag{8}$$

Reference is also made to earlier explanations about the parameters being used.

The value of Delegation Auth may be computed as follows:

Delegation Auth=$CMAC(K_I;(P_i\|$Allowed Type Segment$);128)$

The Body object of the Provisioning Structure contains the provisioning payload. The payload is a command that carries out one of the following operations:
ADD Adds a key
DEL Deletes a key
ENU Enumerates (i.e., lists) the keys already stored
This Body object may comprise six fields:
COMMAND The command, represented by at least three bits, with five remaining combinations reserved for future use.
KEY TYPE The Key Type of the key to be added or removed, or a null value, for the enumeration command.
KEY SLOT The Key Slot of the key to be added or removed, or a null value, for the enumeration command.
KEY VALUE The actual key to be added, or a null value for commands that are not 'ADD'. If not null, the contents of this field are encrypted.
KEY ID The ID of the key to be added or removed, or a null value for the enumeration command.
PAYLOAD AUTH A MAC on all the above fields.

The Key Value field may be the only field of which content is encrypted. Encryption may be done using AES CCM, or any other approved mode, with a key that derives from $P_i$ (or R, if there are no Delegation Structure objects in that Provisioning Structure). $P_i$ may be the key that was introduced by the last Delegation Structure object preceding the Body object. The encryption key, $K_E$, may be computed in accordance with any known method with a CMAC PRF in accordance with:

$$L = E(P_i, 0^b) \quad (9)$$

$$K_1 = \begin{cases} L \ll 1 & MSB_1(L) = 0 \\ (L \ll 1) \oplus 0^{120}10000111 & MSB_1(L) \neq 0 \end{cases} \quad (10)$$

$$T = E(P_i, K_1 \oplus (1^1\|PROVPENC\|0\times 00\|0^{47}\|10^7)) \quad (11)$$

$$K_E = T \quad (12)$$

The Key Value field may then be computed as the AES CCM encryption of the key to be provisioned, k, with the encryption key deriving from $P_i$, as follows:

KEYVALUE=$E(K_E,k)$

The value of Payload Auth is a CBC-MAC computed over all other fields of the Body structure. The CBC-MAC may be computed using a key that derives from $P_i$ (or R, if i=1). The MAC key, $K_I$, is computed in accordance with known methods with a CMAC PRF in accordance with:

$$L = E(P_i, 0^b) \quad (13)$$

$$K_1 = \begin{cases} L \ll 1 & MSB_1(L) = 0 \\ (L \ll 1) \oplus 0^{120}10000111 & MSB_1(L) \neq 0 \end{cases} \quad (14)$$

$$T = E(P_i, K_1 \oplus (1^1\|PROVPMAC\|0\times 00\|0^{47}\|10^7)) \quad (15)$$

$$K_I = T \quad (16)$$

Refer to earlier explanations about the parameters used. The value of Payload Auth may be computed as follows:

Delegation Auth=$CMAC(K_I;($Command$\|$Key Type$\|$Key Value$\|$Key ID$);128)$

The following functions may be performed by a Key Provisioning System according to some embodiments.

Root Key Provisioning is the operation in which the value of R is entered into the device. Single Value Insertion—Provided that there are no pre-existing secrets on the device which can be employed for secure provisioning of R, it can only be inserted into the device by means that allow only for its setting, never for its unrestricted retrieval. Such means can be programmed as part of the Key Provisioning System, as long as the storage used to keep R is such that, while being run-time programmable, is not readable by logic which is not part of the Key Provisioning System.

In the case of a global R value, this value can be included as part of the RTL (Register Transfer Level) description provided to the chip manufacturer. Obfuscation techniques may be used to disguise the value of R so that it is not readily evident to whoever views the RTL description.

Two exemplary options for inserting the value of R: (a) using a write-only mechanism as part of the Key Provisioning System, along with exclusive-access storage; (b) using a hard-coded value of R for a group of devices.

The value of R may be random, deriving from an approved PRNG that was fed by an approved (given the existence of one) RNG.

Multiple Shares Insertion: instead of inserting a single R value, multiple Root Key Components may be inserted. Each Root Key Component value is inserted as if it was the single value of R, as detailed above. That is, each Root Key Component can be included in the RTL or received into the device (e.g., using a write-only mechanism). R will be computed from these components (a.k.a., "key shares") as a combination of them all.

Owner may have knowledge of all Root Key Components, to be able to exercise its right as the root provisioning entity. However, it does not need to actually store all components. It is enough for Owner may compute the value of R that all components convey together and store this value.

The provision of the Root Key, R, as several Root Key Component values rather than as a single Root Key value has no implication on the perception of R as a root of trust for provisioning, and all operations using R have the same security model. The only implication of provisioning R as a set of components is on the trust it requires of the entities provisioning (or otherwise having access to) these components. In accordance with the Trivial Secret Sharing Scheme being used in the Key Provisioning System, when allowing each one of n entities to provision a single Root Key Component each, none of these entities can determine R with better than pure guessing probability on the entire key space or R. This assertion also applies to any group of i colluding entities, just as long as i<n.

The value of each Root Key Component $R_i$ shall be random, deriving from an approved PRNG that was fed by an approved (given the existence of one) RNG. No waivers or exemptions apply in spite of the fact this single value cannot itself recover, or assist the recovery of, the Root Key.

Root Key Derivation: if the value of the Root Key was provided as a single Root Key value, then its derivation is by reading it.

If the value of R was not provisioned explicitly, but is a combination of n Root Key Component values, then the n shares are retrieved as $R_1 \ldots R_n$, and the value of R may be computed as follows:

$$R = R_1 \oplus R_2 \oplus \ldots \oplus R_n$$

No other use may be made of any of the $R_1 \ldots R_n$ values, unless explicitly specified and approved.

Functional Key Provisioning is the process in which a Functional Key is inserted into the device. The entity that provisions a Functional Key of a particular Key Type is either Owner, or a Sub-owner who was delegated with authority to provision keys of that Key Type. Authority could have been delegated either from Owner or from another Sub-owner who is itself authorized to provision keys of the same Key Type, or of a more general Key Type Prefix. This section assumes that delegation has already been carried out, as specified in Section delegation.

To insert a Functional Key k of Key Type t, into the device, the following steps may be performed:

1. The provisioning entity carries out the following operations, in the order specified:
   (a) If the provisioning entity is a Sub-owner, then it finds a proper chain of DELEGATION STRUCTURE objects, allowing it to provision a key of type t. If the entity was delegated by Owner, then such a chain is likely to have one DELEGATION STRUCTURE element. If the entity was delegated by another Sub-owner, then the chain will include DELEGATION STRUCTURE objects chaining from Owner to the immediately delegating Sub-owner, along with a final DELEGATION STRUCTURE object delegating authority from that Sub-owner to the Sub-owner to provision the key. The chain is always provided to the provisioning entity in its entirety by the immediately delegating Owner/Sub-owner—it is never constructed by the provisioning entity. The selected chain shall be one in which all ALLOWED TYPE SEGMENT fields of the DELEGATION STRUCTURE objects, when concatenated with the DELIMITER added between them, and with a DELIMITER added at the end, form a prefix of t. For example, a chain of DELEGATION STRUCTURE objects with the following respective ALLOWED TYPE SEGMENT fields: -System-, -Apps/DRM-, and -Scheme1-, are suitable for provisioning a key where t=-System/Apps/DRM/Scheme1/PrKey-.
   (b) It creates a BODY element containing 'ADD' in the COMMAND field, and a KEY TYPE field, which holds the value of t, after cutting off the Key Type Prefix generated by the entire chain of DELEGATION STRUCTURE objects, if such exist. (By the above example, the KEY TYPE field will contain -PrKey-.)
   (c) It uses its key, P, to compute both encryption and integrity keys: $K_E$ and $K_P$ respectively. If the provisioning entity is Owner, then P=R. Computation of these keys shall be done as specified in Section body.
   (d) It encrypts k with $K_E$ using AES CCM.
   (e) It appends $E(K_E,k)$, the value of KEY ID, t (as the KEY TYPE), and a KEY SLOT value, to the BODY structure.
   (f) It computes a MAC using $K_I$ as the key, on the entire BODY structure.
   (g) It forms a PROVISIONING STRUCTURE from both the chain of DELEGATION STRUCTURE objects and the BODY structure. The resulting PROVISIONING STRUCTURE forms the Provisioning Message.
   (h) It may append to the Provisioning Message additional PROVISIONING STRUCTURE objects in a similar manner. As an implementation decision, it may be permissible to append several BODY structures to the same PREAMBLE, if they all suit the same Key Type Prefix (chain of DELEGATION STRUCTURE objects).
   (i) It communicates the Provisioning Message to the Key Provisioning System on the device.
2. The client of the Key Provisioning System on the device receives the Provisioning Message, and performs the following operations:
3. It sets: C←R; A←∅
4. It follows the chain of DELEGATION STRUCTURE objects in the Preamble; for each such structure carrying out the following actions:
   (a) Parse the DELEGATION STRUCTURE object: the ALLOWED TYPE SEGMENT into a, the TARGET KEY into t, and DELEGATION AUTH into m.
   (b) Compute $K_I$ using C and the routine specified in Section delegation-format.
   (c) Compute a MAC on the DELEGATION STRUCTURE object.
   (d) Compare the computed MAC with m. Terminate the process immediately if MAC values do not match. Indication may include the value of m where failure occurred.
   (e) Compute $K_E$ using C and the routine specified in Section delegation-format.
   (f) Set: C←D ($K_E$, t)
   (g) Set: A←A∥a∥DELIMITER
5. It parses the BODY structure of the PROVISIONING STRUCTURE object: the COMMAND, the KEY TYPE into t, the KEY SLOT into s, the KEY VALUE into k, the KEY ID, and the Payload Auth into m. The value of COMMAND is ADD, by the use-case definition.
6. It computes $K_I$ using C and the routine specified above.
7. It computes a MAC using $K_I$ and the fields of the BODY structure.
8. It compares the computed MAC with m. It terminates the process immediately if MAC values do not match. Indication may include the fact that MAC of the BODY structure failed.
9. It computes: T←A∥t
10. It computes $K_E$ using C and the routine specified above.
11. It computes $D(K_E,k)$ to obtain the key to be added.
12. It checks if a key is already stored with both the same Key Type t and the same Key Slot s. It reports a suitable error if one does, and terminates the process.
13. It files the decrypted key $D(K_E,k)$, along with the computed Key Type T, Key Slot s, and the value of KEY ID.
14. It reports success.

The actions carried out by the provisioning entity and the Key Provisioning System on the device may be interlaced, so not to require the Key Provisioning System to store large chunks of data, such as the chains of Delegation Structure objects. For example, structures can be sent to the Key Provisioning System one by one, with the Key Provisioning System merely retaining a state throughout the process.

Enumeration and Removal of Keys: The process for the removal of keys resembles the process for addition of keys, with the following exceptions: (a) No KEY VALUE is provided in the BODY structure; (b) The key with the proper KEY TYPE and KEY SLOT is removed, if it exists.

The process for the enumeration of keys resembles the process for addition of keys, with the following differences:

(a) No KEY VALUE is provided in the BODY structure. (b) The response from the Key Provisioning System may consist of the all type of KEY TYPE, KEY SLOT, and KEY ID, for those keys for which the KEY TYPE field starts with the value of T as computed above. In other words, the keys listed will be the ones of which the KEY TYPE field starts with T, which is conveyed by the combination of the BODY structure and the chain of DELEGATION STRUCTURE objects that were provided. (c) The KEY TYPE field of the BODY structure may be empty.

Figure 2:
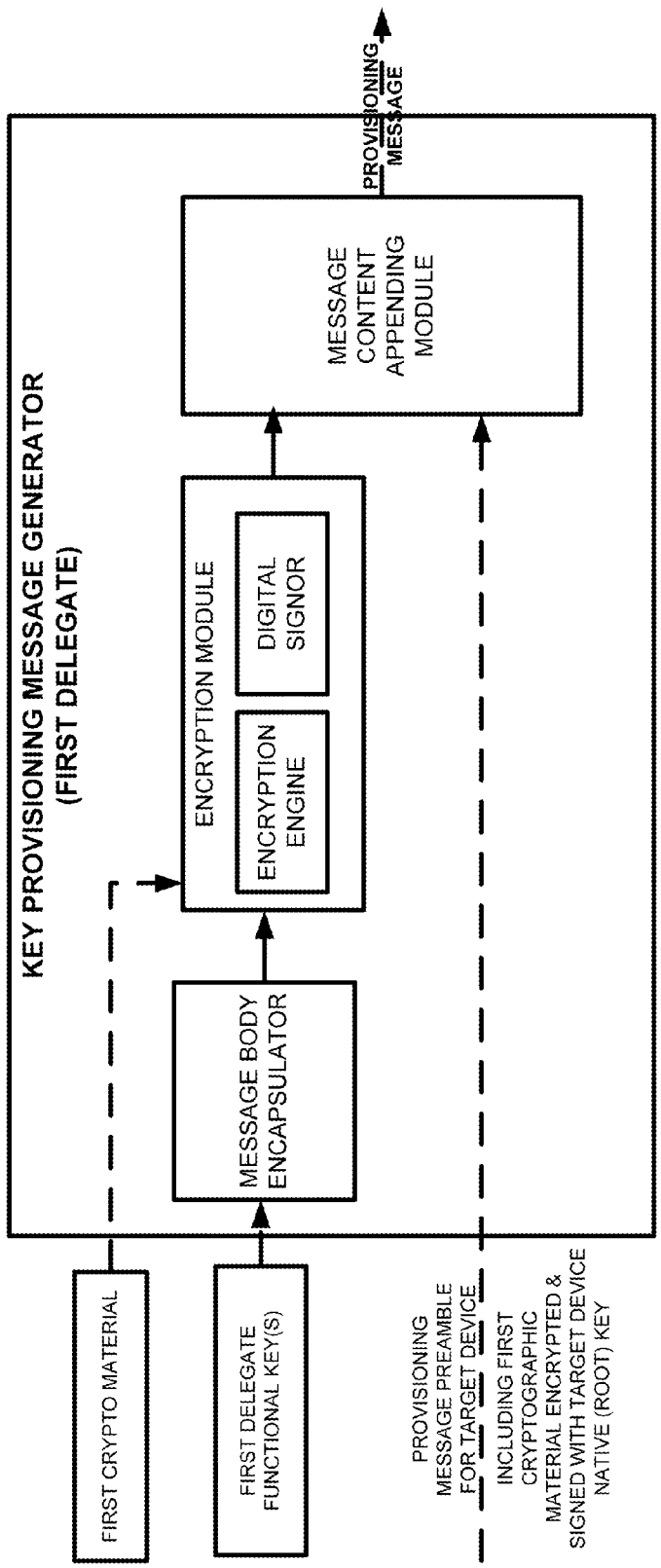
FIG. 2 is a schematic block diagram illustration of a provisioning message generator, which may be used by a first delegate, in accordance with some demonstrative embodiments of the present invention.
Figure 3:
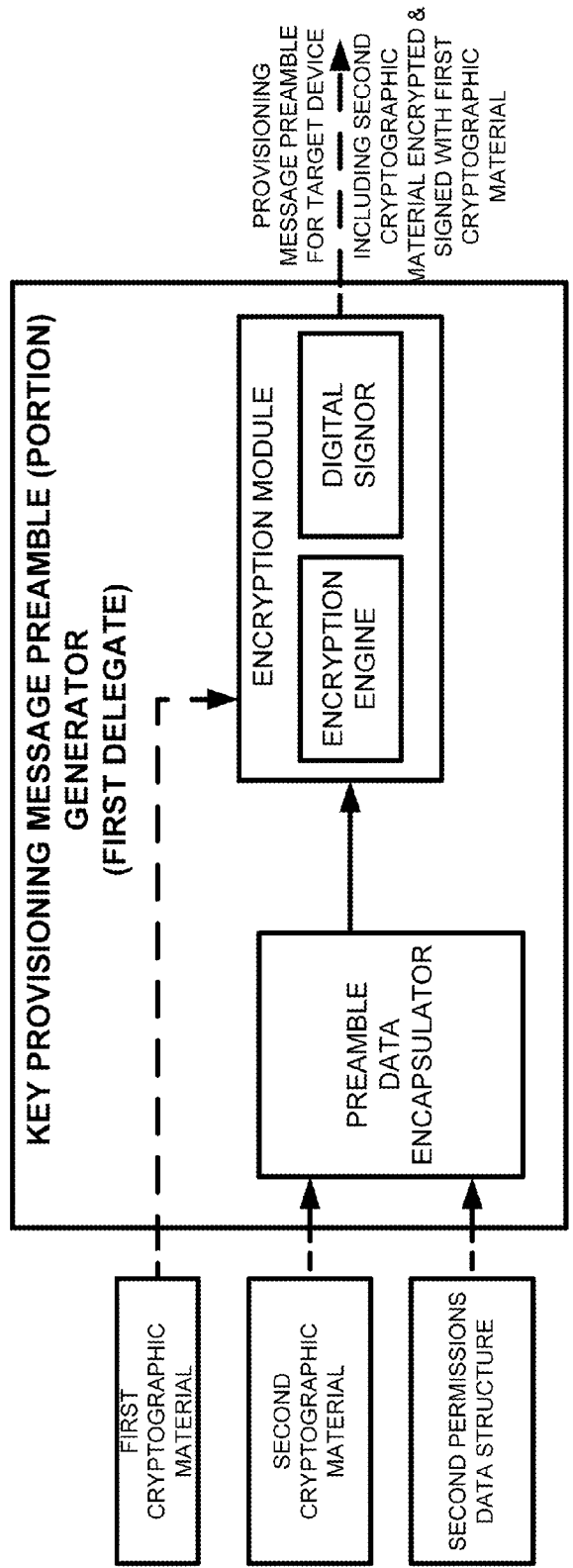
FIG. 3 is a schematic block diagram illustration of a provisioning message preamble generator, which may be used by a first delegate to generate a message second portion for a preamble useable by a second delegate, in accordance with some demonstrative embodiments of the present invention.
Figure 4:
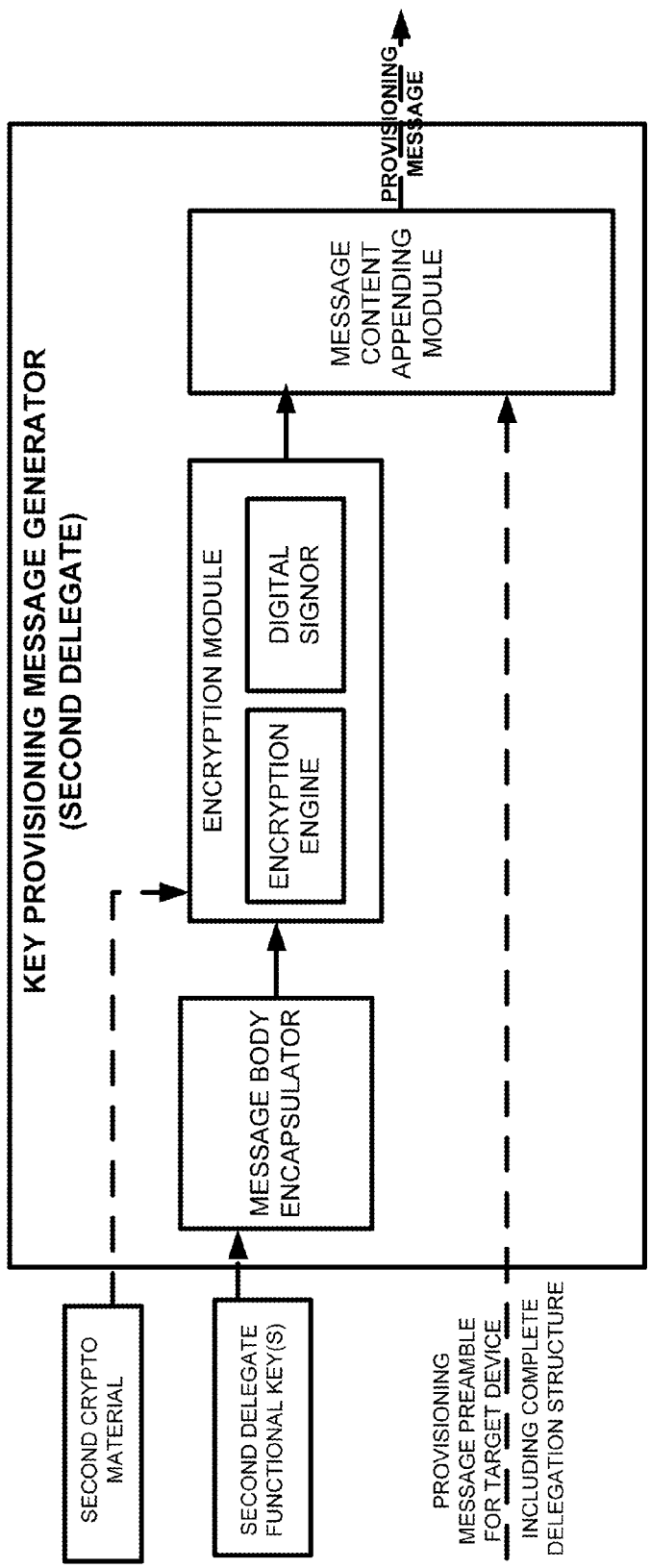
FIG. 4 is a schematic block diagram illustration of a provisioning message generator, which may be used by a second delegate, in accordance with some demonstrative embodiments of the present invention.
Figure 5:
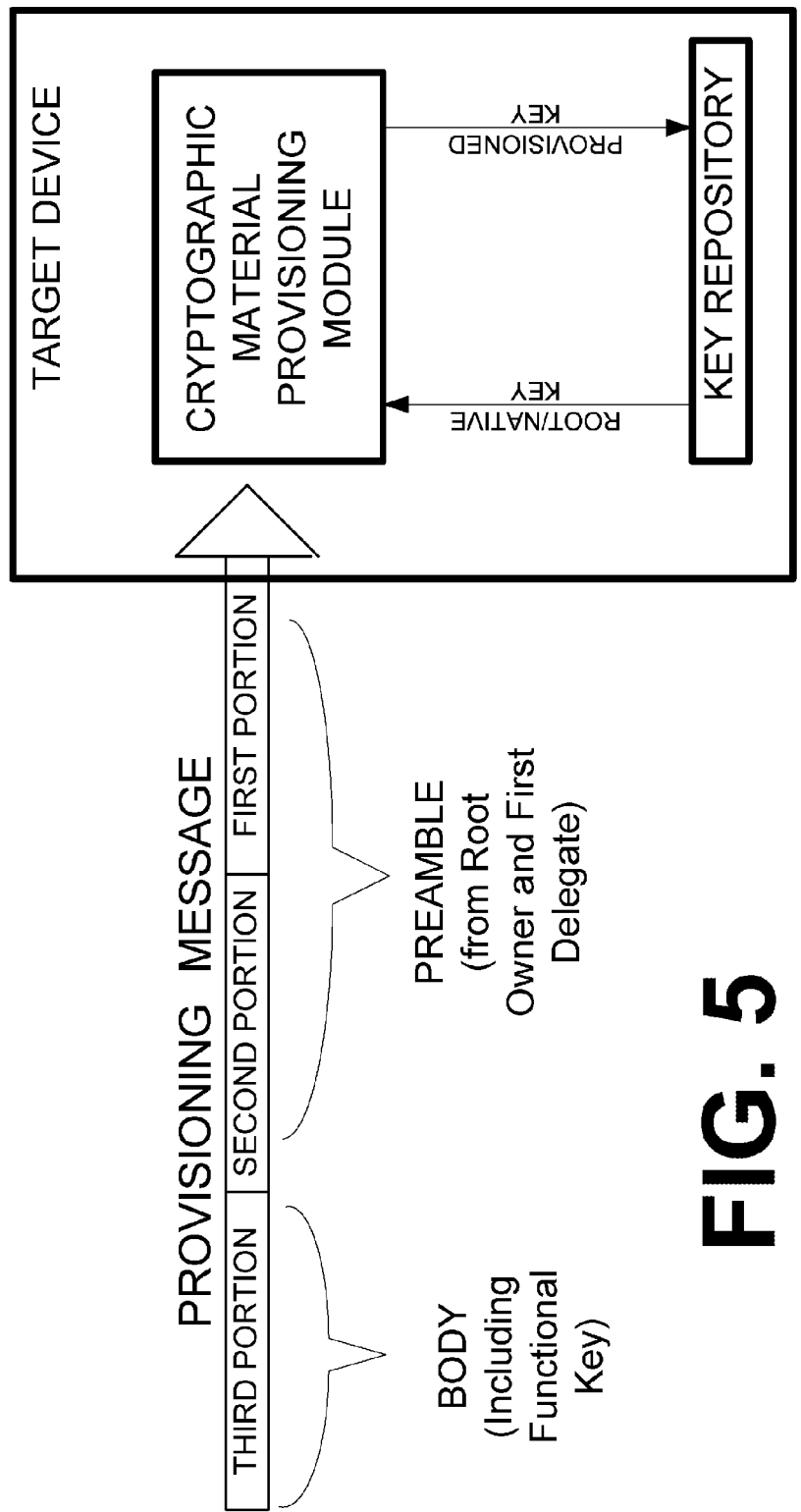
FIG. 5 is a schematic block diagram illustration of a target device comprising a cryptographic material provisioning module able to receive a provisioning message, in accordance with some demonstrative embodiments of the present invention.

Turning to FIG. 1, there is shown a functional block diagram of a provisioning message preamble generator used by a target device root owner according to embodiments of the present invention. FIG. 2 is a functional block diagram of a provisioning message generator used by a first delegate according to embodiments of the present invention. FIG. 3 is a functional block diagram of a provisioning message preamble generator used by a first delegate to generate a message second portion to a preamble useable by a second delegate in accordance with embodiments of the present invention. FIG. 4 is a functional block diagram of a provisioning message generator used by a second delegate according to embodiments of the present invention. FIG. 5 is a functional block diagram of a target device including a cryptographic material provisioning module receiving a provisioning message in accordance to some embodiments of the present invention.

In accordance with some embodiments of the present invention, an electronic device may comprises: a cryptographic material provisioning (CMP) module to perform a method comprising: (a) receiving a CMP message which comprises a preamble and a payload; (b) decrypting the preamble of the CMP message by using a root key of the electronic device; (c) extracting from the decrypted preamble of the CMP message a first cryptographic key; (d) extracting from the decrypted preamble of the CMP message a primary permissions data vector indicating at least one of: (A) a type of keys that are authorized to be provisioned to the electronic device by a user of the preamble, and (B) an indication of whether or not the user of the preamble is authorized to delegate key provisioning rights to other entities; (e) decrypting at least a portion of the payload of the CMP message by using the first cryptographic key that was extracted from the preamble; (f) extracting a functional cryptographic key from the decrypted payload of the CMP message, wherein the extracted functional cryptographic key comprises a cryptographic key associated with at least one of: an application installed on the electronic device, and a process running on the electronic device; (g) checking key metadata, of the extracted functional cryptographic key, against one or more usage permissions indicated by the primary permissions data vector, and determining whether or not the extracted functional cryptographic key is of a type permitted for provisioning; (h) if it is determined that the extracted functional cryptographic key is of a type permitted for provisioning by the permissions data vector, then provisioning the extracted functional cryptographic key to said electronic device, wherein the provisioning comprises at least one of: (x) storing the extracted functional cryptographic key in the electronic device, (y) using the extracted functional cryptographic key in the electronic device, (z) installing the extracted functional cryptographic key in the electronic device; wherein the CMP message comprises a multi-level delegation hierarchy for provisioning one or more cryptographic keys for use by one or more applications of the electronic device; wherein the root key of the electronic device is used to delegate at least partial key provisioning rights to one or more other parties; wherein at least one of said other parties is authorized, based on a respective permissions data vector, to delegate at least part of the key provisioning rights to one or more other parties, wherein the electronic device is implemented by utilizing at least a hardware component.

In some embodiments, some or all of the preamble is digitally signed using the root key of the electronic device.

In some embodiments, said extracted functional cryptographic key is utilized by the electronic device for a process selected from the group consisting of (1) decrypting data, (2) encrypting data, (3) digital rights management, (4) signature generation, (5) signature verification, and (6) payment application.

In some embodiments, said CMP module is to regulate usage of the extracted functional cryptographic key by an application of the electronic device in accordance with usage permissions indicated by key metadata and by the primary permissions data vector.

In some embodiments, the method comprises: extracting from the decrypted payload of the CMP message a second cryptographic key usable for decrypting another portion of the CMP message.

In some embodiments, the decrypted payload of the CMP message further comprises a second permissions data vector; and said CMP module is to regulate usage of said second cryptographic key in accordance with usage limitations of both the first and second permissions data vectors.

In some embodiments, said CMP module is to process a portion of the CMP message using the second cryptographic key.

In some embodiments, said CMP module is to regulate usage of the extracted functional cryptographic key, extracted from said CMP message, in accordance with all usage limitations of all permissions data vectors within the CMP message.

In some embodiments, the primary permissions data vector defines one or more types of functional cryptographic key which may be included in the CMP message.

In some embodiments, said CMP module is not to process cryptographic material in the CMP message associated with functional keys of a type that is different from types defined in the primary permissions data vector.

In some embodiments, extracting the functional cryptographic key from the decrypted payload of the CMP message comprises: (A) determining that the decrypted payload comprises a secondary permissions data vector and a second cryptographic key; (B) extracting from the decrypted payload said secondary permissions data vector and said second cryptographic key; (C) regulating usage of the extracted functional cryptographic key in accordance with usage limitations of both the primary permissions data vector and the secondary permissions data vector.

In some embodiments, the CMP message comprises a two-part preamble and a payload portion; wherein the two-part preamble comprises: (A) a first preamble portion which stores (i) a first cryptographic key, encrypted by using the root key of the electronic device; and (ii) a first permissions vector associated with the first cryptographic key, wherein the first permissions vector defines provisioning limitations associated with the first cryptographic key; and (B) a second preamble portion which stores (iii) a second cryptographic key, encrypted by using the first cryptographic key; and (iv) a second permissions vector associated with the second cryptographic key, wherein the second permissions vector defines provisioning limitations associated with the second cryptographic key; wherein the payload portion comprises: (v) said functional cryptographic key, encrypted by using the second cryptographic key; wherein provisioning of the functional cryptographic key is regulated by provisioning limitations which correspond to an aggregation of the provisioning limitations of the first and second permission vectors.

In some embodiments, the multi-level delegation hierarchy has a non-predefined length.

In some embodiments, the CMP message comprises data for partial delegation functionality based on key types; wherein a member in a provisioning rights delegation hierarchy is authorized, by a respective permissions vector, to define which delegated key provisioning rights its delegates receive by delegation.

In some embodiments, the CMP message comprises data indicating that delegated key provisioning rights do not exceed key provisioning rights of a member higher in the a multi-level delegation hierarchy.

In some embodiments, the preamble of the CMP message is generated for a specific target device and is provided to a party intending to utilize the functional cryptographic key on said target device.

In some embodiments, the preamble of the CMP message: (A) is generated for a specific group of multiple target devices, and (B) is provided to a party intending to utilize the functional cryptographic key on said target device.

In some embodiments, the specific group of multiple target devices comprises at least one of: a group of multiple electronic devices that have a common maker; a group of multiple electronic devices that have a common model.

In some embodiments, a method of cryptographic material provisioning (CMP) may be implementable on an electronic device which comprises at least a hardware component; the method may comprise, for example: (a) receiving a CMP message which comprises a preamble and a payload; (b) decrypting the preamble of the CMP message by using a root key of the electronic device; (c) extracting from the decrypted preamble of the CMP message a first cryptographic key; (d) extracting from the decrypted preamble of the CMP message a primary permissions data vector indicating at least one of: (A) a type of keys that are authorized to be provisioned to the electronic device by a user of the preamble, and (B) an indication of whether or not the user of the preamble is authorized to delegate key provisioning rights to other entities; (e) decrypting at least a portion of the payload of the CMP message by using the first cryptographic key that was extracted from the preamble; (f) extracting a functional cryptographic key from the decrypted payload of the CMP message, wherein the extracted functional cryptographic key comprises a cryptographic key associated with at least one of: an application installed on the electronic device, and a process running on the electronic device; (g) checking the extracted functional cryptographic key against one or more usage permissions indicated by the primary permissions data vector, and determining whether or not the extracted functional cryptographic key is of a type permitted for provisioning; (h) if it is determined that the extracted functional cryptographic key is of a type permitted for provisioning by the permissions data vector, then provisioning the extracted functional cryptographic key to said electronic device, wherein the provisioning comprises at least one of: (x) storing the extracted functional cryptographic key in the electronic device, (y) using the extracted functional cryptographic key in the electronic device, (z) installing the extracted functional cryptographic key in the electronic device; wherein the method is implemented by an electronic device comprising at least a hardware component; wherein the CMP message comprises a multi-level delegation hierarchy for provisioning one or more cryptographic keys for use by one or more applications of the electronic device; wherein the root key of the electronic device is used to delegate at least partial key provisioning rights to one or more other parties; wherein at least one of said other parties is authorized, based on a respective permissions data vector, to delegate at least part of the key provisioning rights to one or more other parties.

Applicants have realized that a problem exists with regard to asset provisioning or cryptographic key provisioning, and that the problem may be common to many electronic devices that perform operations that should not be cloned by other devices. For cryptographic computations, to be such that can only be performed by a desired device, such device may be required to have access to data assets that are not available outside that device. Since the computation algorithm itself may not necessarily be confidential, the availability of such an asset is the only factor preventing a cloned, emulated, or otherwise undesired device, from performing an identical operation (e.g., fraudulently, by an attacker). In a demonstrative example, a Digital Rights Management (DRM) agent, such as a PlayReady client or a High-bandwidth Digital Content Protection (HDCP) receiver, may perform digital content decryption using key material that is presumably not available outside the device.

Applicants have realized that provisioning of protected assets (e.g., cryptographic keys), poses a challenge by being different from the other types of provisioning that a device is typically subject to, at least by three factors. First, the provisioned material should be provisioned securely, in a way that the confidentiality and/or the integrity of the provisioned material is protected. Second, the provisioned asset may be unique per device, or per a group (or batch) of devices, as opposed to typical software packages and images. Third, the provisioned asset may have monetary value associated with it, such that its acceptance by the device should be uniquely and positively indicated, and such indication may be used for billing purposes, licensing purposes, or other purposes having monetary consequences.

Applicants have developed a novel asset provisioning system, which may benefit multiple stakeholders, particularly in the field of Integrated Circuit (IC) manufacturers, device makers, service providers, and users.

A first stakeholder may be an IC Vendor (ICV), which may be a manufacturer of an IC of an electronic device where the system is deployed.

A second stakeholder may be an Original Equipment Manufacturer (OEM), which may obtain the IC from the ICV, and may assemble and ship the electronic device to end-users or to intermediary distributors (e.g., retailers, offline stores, online merchants).

A third stakeholder may be a Service Provider (SP), who may render service to end-users of the device, via the device. In some consumer electronic devices, the SP may provide services to managed devices which may be owned by the SP and may be managed by the SP; or the SP may provide services to non-managed devices, which may be owned and/or managed by a third party (e.g., the end-user itself, or an enterprise).

As demonstrated in the following use cases, some embodiments of the present invention may allow to maintain partial mistrust between stakeholders; and may allow secure provisioning of assets, as well as secure delegation of provisioning rights, even among parties that do not have complete trust among themselves, or among parties that may have partial mistrust among themselves.

In a first demonstrative use case, the present invention may enable secure provisioning of service keys. For example, the device may include an installed application, which may need to be provisioned with cryptographic material. The application is trusted to access the assets, using any suitable mechanism. The cryptographic material may be provided to each device individually, may be unique per device or per group of devices, and may facilitate the personalization of the secure application. The present invention may allow, for example, secure delivery of HDCP Rx key (HDCP Device Key) by the OEM or by the SP to deployed devices; secure delivery of Fast Identity Online (FIDO) Attestation key (a Class key) by the OEM or SP to deployed devices; secure delivery of PlayReady Model Key or PlayReady Device key by the content service provider to deployed devices; secure delivery of Wi-Fi Protected Access (WPA) key (a class Key), or other wireless communication cryptographic keys, by the SP or by other entity (e.g., an Information Technology (IT) department of an enterprise or organization) to deployed devices; or the like.

In a second demonstrative use case, the present invention may enable deferred personalization as a byproduct of the ability to provision service keys at any point over the device lifetime. For example, the present invention may allow to defer a licensing event, possibly along with its associated transaction, to a subsequent point in time at which the particular device actually requires the service.

In a third demonstrative use case, ad-hoc device assignment may be achieved. For example, parameters of the IC or of the device, may differ between instances that are shipped to different geographical regions or provided to different customers. This may require the provider (e.g., the ICV or the OEM) to configure its product before it is shipped, according to the destination of the shipment. This constraint may imply reduced flexibility in assigning and re-assigning products, as the products have to be tailored to their destination before leaving the premises of the provider. The provisioning mechanism of the present invention may allow the provider to provision configuration data at any time after the product leaves its premises, thereby allowing the provider to regain that flexibility.

In a fourth demonstrative use case, the present invention may allow flexibility in feature activation. For example, an ICV or OEM may sell different versions of the same product based on different sets of features that are enabled or disabled; with pricing determined accordingly. This may require that the parameters that indicate which features are enabled (or disabled) be provisioned to the device securely, and the present invention may enable such secure provisioning.

In a fifth demonstrative use case, the present invention may allow enforcement of manufacturing agreements. For example, the ability to "mark" and IC and devices may allow the IC vendor and/or the OEM to monitor the destiny of its designs, e.g., in terms of how many of them are manufactured and where they are sold. This may allow mitigating of "gray markets" (which are further discussed herein, in the following use case), as well the phenomenon of "third shifts". Having a secure capability to tag products in the field, along with the ability to control the products based on this tag, allows the stakeholder to monitor and/or enforce what products operate in what region.

In a sixth demonstrative use case, the present invention may allow mitigation or elimination of "gray markets" for ICs or electronic devices. For example, an IC vendor or OEM may ship similar IC designs or similar devices, to different distribution regions, possibly by different distribution channels. The same product may be sold in different regions for different prices. There may often be an incentive to form "gray markets", where an IC or a device is purchased for a low price at one region, and sold for a higher price in another region which is expected by the IC vendor or OEM to be served by another channel that sells the product for a higher price.

In a seventh demonstrative use case, the present invention may allow mitigation or elimination of "third shift" problems. An IC vendor may contract an external fabrication house, thereby having a risk that the manufacturer might in practice manufacture more ICs than reported, and sell them for its own gain. Similarly, an OEM may engage an external manufacturing or assembly factory (or an ODM, original design manufacturer), and may have a similar risk of the ODM manufacturing "clone" devices built on the OEM's design.

Some embodiments of the invention may be used for secure provisioning of various types of data items or digital items. Some embodiments may be utilized for secure provisioning of cryptographic assets, encryption keys, decryption keys, passwords, pass-phrases PINs, or the like. Some embodiments may be utilized for secure provisioning of non-cryptographic assets, or digital assets that may not necessarily include encryption keys and/or decryption keys. Some embodiments may be used for secure provisioning of both cryptographic assets and non-cryptographic assets. Some embodiments may be used for secure provisioning of licenses, playback licenses, software licenses, DRM licenses, multimedia licenses, activation code(s), software keys or product keys, serial numbers, unique identification numbers, or the like. In some embodiments, the terms "cryptographic asset" or "cryptographic key" may optionally include also such activation codes, licenses, playback licenses, software licenses, DRM licenses, multimedia licenses, software keys or product keys, serial numbers, unique identification numbers, digital files, or the like; as well as other suitable data items or data objects, for example, which may enable or disable or activate or deactivate one or more features or functionalities of an electronic device. Embodiments of the invention may be used in conjunction with secure provisioning of other suitable types of assets or data items.

Figure 6:
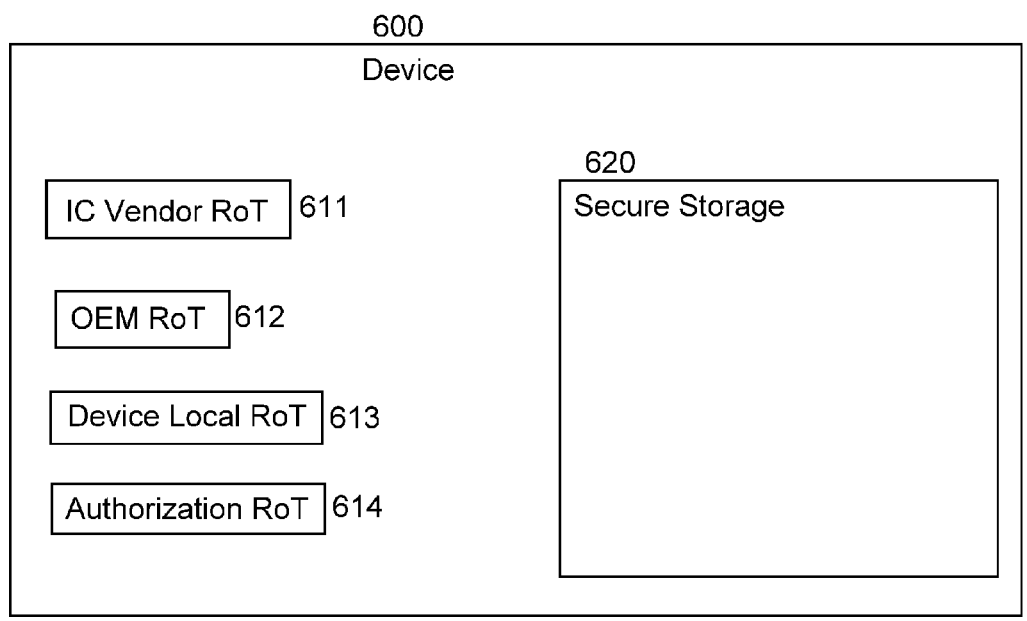
FIG. 6 is a schematic block diagram illustration of an electronic device, in accordance with some demonstrative embodiments of the present invention.

Reference is made to FIG. 6, which is a schematic block diagram illustration of an electronic device 600 in accordance with the present invention. Device 600 may be or may comprise, for example, a smartphone, a cellular phone, a tablet, a phone-tablet ("Phablet") device, a laptop computer, a notebook computer, a portable gaming device, a portable communication device, a portable wireless device, a portable computing device, a handheld device, a vehicular device, an Internet-connected device or appliance or environment, an "Internet of Things" (IoT) device or appliance or environment, a device connected to a "cloud" or to a "cloud computing" system or network, a Machine to Machine (M2M) system or environment, or other suitable electronic device.

Device 600 may comprise, for example, one or more Root of Trust (RoT) elements 611-614, as well as a secure storage 620. In a demonstrative example, RoT element 611-614 are depicted as located in device 600 outside of secure storage 620; however, in some embodiments, one or more, or all, of RoT elements 611-614 may be stored within secure storage 620. Device 600 may optionally comprise other hardware components and/or software modules that may often be included in an electronic device or computing device, for example, a processor, a central processing unit (CPU), a digital signal processor (DSP), a graphics processing unit (GPU), an input unit (e.g., a touch-screen, a keyboard, a physical keyboard, an on-screen keyboard, a keypad, a microphone, a stylus), an output unit (e.g., a screen, a touch-screen, audio speakers), a memory unit and/or storage unit (e.g., RAM unit(s), ROM unit(s), Flash memory, an SD-card, a SIM card, short-term memory units, long-term memory units, volatile memory, non-volatile memory), wireless transceiver(s) (e.g., Wi-Fi transceiver, cellular 4G transceiver, cellular 4G LTE transceiver, cellular 3G transceiver), antenna, Bluetooth component(s), GPS components(s), power source (e.g., rechargeable battery), an Operating System (OS), drivers, software applications, or the like.

ICV RoT 611 may be or may comprise an asymmetric master key, and may be used to identify ICs that are manufactured by the particular ICV. The private key may be composed of two key shares: a first key share which may be fixed in Register-Transfer Level (RTL); and a second, non-fixed key share which may be programmed into on-die One-Time-Programmable (OTP) memory during IC manufacture. Proper management of the non-fixed (e.g., OTP) key share may allow the ICV to use different keys for each batch of ICs. If these batches also correspond to warehousing or distribution granularity, then the ICs used by different OEMs may have different root keys, thereby allowing to protect the ICV's supply chain. ICV RoT 611 may be the primary secret RoT that is also known outside of device 600.

This master key is used to derive two private keys: $k_{ICV;E}$ used for encryption and $k_{ICV;A}$ used for authentication; and one symmetric association key $k_a$. The corresponding public keys are $K_{ICV;E}$ and $K_{ICV;A}$. The public keys are certified by the IC Vendor by signing them with an ICV server private key $k_s$ and storing the certificate on the device:

$$C_{ICV} = S[k_S, K_{ICV;A} \| K_{IVC;E}]$$

Accordingly, other parties may validate the keys during protocol execution using an ICV server public key, $K_s$. To create the signature, the IC Vendor deploys a hardware security module (HSM)—that holds $k_s$ and the RTL share: given the OTP share, the HSM calculates $k_{ICV;A}$ and $k_{ICV;E}$ and generates $C_{ICV}$ (the OTP share may be also generated and outputted by the same HSM). The symmetric association key $k_a$ is used by IC Vendor for provisioning the same way as other Provisioning Servers use their own association keys (note that all such keys are denoted $k_a$).

Some of the protocols described herein may utilize $Ik_a$, the identity of $k_a$, to select a specific association key. $Ik_a$ has a special value to denote the $k_a$ used by IC Vendor for provisioning; otherwise $Ik_a$ consists of the identity of the Provisioning Server $I_{PRS}$, and the type of the association key ("personalized" or "class-wide"). The identity of the Provisioning Server $I_{PRS}$ may be calculated as a hash:

$$K_{PRS;E}:I_{PRS}=H[K_{PRS;E}])$$

Device Local RoT 613 may be a symmetric master key, which may be utilized for secure storage on device 600, as well as for deriving session keys. Device Local RoT 613 may be generated within device 600 by device 600 itself, and may not be available externally to device 600.

Authorization RoT 614 may be a public authorization key, which may be used to verify the eligibility or identities of communicating entities. These identities may serve a back-end component or sub-system which may be responsible for billing and/or reporting. Therefore, Authorization RoT 614 need not be trusted by the provisioning and delegation mechanisms, and a compromise of Authorization RoT 614 does not pose a threat to provisioned assets and/or to the delegation mechanism. Authorization RoT 614 may be hard-coded, and may be functionally equivalent in all devices that utilize the mechanisms of the present invention. The private key that is the counterpart of the public key of Authorization RoT 614 may be available only in an authorization server, or in back-end components or sub-systems associated with such authorization server.

Some embodiments may optionally use an OEM RoT 612, which may be an asymmetric master key able to identify devices that are manufactured by a specific OEM, based on a specific IC. The private key of OEM RoT 612 may be derived from ICV RoT 611 and the OEM's code-signing public key. OEM RoT 612 may be generally equivalent in its functional purpose to the ICV RoT 611; but OEM RoT 612 may be further specific for the OEM. The OEM RoT 612 may be specific for a combination of an OEM and the public key used to verify the boot image. In some implementations, the OEM RoT 612 may be known only to the ICV, and may not be known to the particular OEM (or to other OEMs or third parties). For example, the particular OEM may use a delegation mechanism (e.g., as described herein) to be introduced with another key that may be used by the OEM for provisioning on behalf of the OEM.

The present invention may utilize suitable cryptographic algorithm(s). For example, some implementations may utilize 128-bit security, symmetric keys and Elliptic Curve Cryptography (ECC) public keys over NIST P-256 curve. For derivation of keys from symmetric master keys, the system may utilize a key derivation function such as, for example, "KDF in Counter Mode" of NIST Special Publication 800-108, "Recommendation for Key Derivation Using Pseudorandom Functions", with AES-CMAC as the pseudorandom function. For symmetric operations, some implementations may utilize 128-bit AES; for example, utilizing CBC mode for encryption, utilizing CMAC mode for authentication, and utilizing CCM mode for authenticated encryption. Cryptographic hashing may be performed with SHA-256. For asymmetric operations, some implementations may utilize ECDSA and ECIES. In all communications and storage, ECC public keys are stored in uncompressed format.

The following notations may be used for cryptographic operations:

E [K,m] denotes encryption of message m using public key K;

E [k,m] denotes symmetric authenticated encryption of message m using secret key k;

H [m] denotes cryptographic hash of message m;

S [k,m] denotes signature of message m using private key k.

A Provisioning Server certificate includes the server's signing public key (also used as an identifier for this server), its encryption public key, and flags assigned by the Authorization Server; the certificate is signed by private key matching the Authorization RoT. The flags may indicate, for example, whether this server has to present an authorization ticket with delegation records and with regular asset provisioning records. Some implementations of the system need not manage a namespace of Provisioning Servers.

Asset Provisioning is a main feature provided by the system. The provisioning protocol may need to satisfy all the relevant security requirements, for example: providing assets only to the correct devices, ensuring asset confidentiality and integrity, and ensuring closure with the billing systems. The provisioning protocol may assure that the server initiating the provisioning transaction is an authorized Provisioning Server.

In some implementations, one or more prerequisites should be met before asset provisioning may be performed, for example: enrollment, key availability, and identification.

With regard to enrollment, before an asset owner can provision an asset to the device using a Provisioning Server, the Provisioning Server must get a Provisioning Server certificate, e.g. for a public key $K_{PRS;E}$, with the Authorization Server. This procedure ensures that devices are only approached by authorized servers.

Additionally, the Provisioning Server has to be properly delegated by a Provisioning Server located higher in the hierarchy, referred to as the Delegation Server. This delegation is expressed in a delegation record which had to be created in the device before asset provisioning can take place. The creation of such delegation record is accomplished using the delegation protocol as detailed herein.

With regard to identification, the provisioning may be carried out using a one-pass protocol. This protocol assumes that the Device and Provisioning Server share a symmetric association key $k_a$. The Device has the value of $k_a$ either derived from the ICV root-of-trust, or from a delegation record pertaining to the Provisioning Server in question. If the value of $k_a$ is not yet available to the Provisioning Server, then an identification protocol (or other suitable discovery protocol) may be performed prior to the one-pass provisioning protocol. For example, the following Identification Protocol may be used:

Provisioning Server→Device:$I_{k_a}$

Provisioning Server←Device:$E[K_{PRS;E}, k_a \| C_{ICV} \| S [k_{ICV;A}, I_{k_a} \| k_a]]$      Protocol 1: Identification Protocol The Provisioning Server initiates the protocol by communicating to Device $Ik_a$, the identity of the symmetric association key $k_a$ to retrieve. If the Device is not provisioned (delegated) to communicate using such an association key, then the device replies with a "nonsense" message indistinguishable from a correct response. Otherwise, the Device has the delegation record corresponding to $I_{PRS}$. In this case Device retrieves the association key $k_a$ corresponding to $Ik_a$, signs $Ik_a$ and $k_a$ using $k_{ICV;A}$, and sends the key together with the certificate $C_{ICV}$ and the signature, all encrypted with the public key of the Provisioning Server, $K_{PRS;E}$. The Provisioning Server uses its private key $k_{PRS;E}$ to decrypt the message, validates the certificate $C_{ICV}$, and stores the association key.

The system may utilize a one-pass provisioning protocol, for example:

Provisioning Server→ Device:$I_{k_a}, E[k_a, M]$      Protocol 2: One-Pass Provisioning Protocol The Provisioning Server sends to the Device $Ik_a$, the identity of the symmetric association key to use, and a message M encrypted using the selected association key $k_a$. The association key was obtained by the Provisioning Server either during the identification stage or was known due to the fact that all devices in a class share the same association key (the class provisioning case).

The encrypted message M may include: (1) a message identifier $I_M$, to prevent a replay attack; (2) the asset id $I_A$; (3) the asset payload A; (4) an optional ticket T (from the Authorization Server), to authorize the process; and (5) other metadata.

Before processing the message M, the device verifies that this delegation record permits processing this type of asset and that the supplied asset id is properly under the prefix permitted for this entity.

If the asset is a hardware feature-activation value, Provisioning Server sends the asset's activation address and the model-identifier for which this asset is valid, as part of $I_A$. If the asset is a hardware feature-activation value, the device verifies compatibility using the model-identifier and access permissions for the activation address.

If the asset id suggests that the provisioned asset is a duplicate of an existing asset, then its value is replaced.

The delegation process allows a Provisioning Server which acts as a Delegation Server to introduce a new Provisioning Server. This is the basis for the hierarchical nature of the provisioning scheme. In a delegation process, the delegating Provisioning Server (which may be referred to as "Delegation Server") generates a delegation message including key material of a new Provisioning Server, and provisioning policy. The delegation message may then be provisioned to devices, enabling the delegated Provisioning Server to perform its own provisioning (or delegation) processes thereafter. The delegation message is provisioned similarly to regular assets, using the authorized one-pass delegation protocol. After execution of the protocol, the Device stores a delegation record corresponding to this Provisioning Server.

For delegation to be performed, the Delegation Server has to be able to provision the device. Therefore, the enrollment and key availability prerequisites stated above need to be met by the Delegation Server. The Delegation Server also has to be authorized for delegation by the Delegation Server which delegated its rights for provisioning, if indeed it was itself delegated by a Delegation Server. Additionally, for the Provisioning Server (target of delegation) to submit the delegation structure to the Device, the enrollment requirement needs to be met by that Provisioning Server.

The delegation may be performed by using the provisioning protocol, except that the asset provisioned, A, is of a special type, a delegation message. The delegation message may comprise: (1) the public key of the delegated Provisioning Server (essential for execution of the identification protocol; (2) encrypted association key (essential for class provisioning); and (3) the provisioning policy to be applied on the delegated Provisioning Server.

For demonstrative purposes, the delegation process may be described herein as if Delegation Server communicates with the Device prior to any communication between the Device and the delegated Provisioning Server. However, it is possible for the delegated Provisioning Server to act as an intermediary in this communication, and thus allow the Provisioning Server to get provisioning rights for a given device while communicating with that device.

To delegate provisioning rights to Provisioning Server, Delegation Server receives from Provisioning Server, through a secure channel, its public encryption key $K_{PRS;E}$ certified by Authorization Server in a Provisioning Server certificate, and the class association key $k_a$ encrypted using $K_{ICV;E}$, namely $E[K_{ICV;E}; k_a]$, where the public key $K_{ICV;E}$ is a part of the device certificate $C_{ICV}$, which can be made available, e.g. using the identification protocol. Using the provisioning process, Delegation Server sends this information to Device, together with the policy for provisioning (the Delegation Server specifies what assets Provisioning Server is authorized to provision) as an asset A and the metadata associated with the asset. The asset id in this case may be $I_{PRS}$, namely, the identity of the Provisioning Server.

After verifying that Delegation Server has rights for delegation and verifying the certificate on $K_{PRS;E}$, the Device prepares the delegation record. For example, if the flag for class-wide provisioning is set, the Device uses $k_{ICV;E}$ to decrypt the class-wide association key $k_a$. If the flag for personalized provisioning is set, then the device randomly generates the personalized association key $k_a$. The Device then stores in the secure storage the delegation record that contains policy, $K_{PRS;E}$, and one or two association keys $k_a$.

Asset management may include common operations on assets, other than provisioning: querying, modification and removal, being carried out using the system by a Provisioning Server.

With regard to Querying, a Provisioning Server that knows an association key of a Device, may query the Device using a querying protocol, for example:

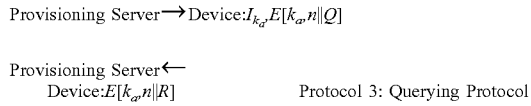

Provisioning Server←
   Device:$E[k_a,n\|R]$                   Protocol 3: Querying Protocol In accordance with the Querying Protocol, the Provisioning Server sends to the Device $Ik_a$, the identity of the symmetric association key to use, and a nonce n together with a query Q encrypted using the selected association key $k_a$. If the Device has the specified association key $k_a$, then Device calculates a response R (the response may also be an error message) and sends it together with the received nonce encrypted with the association key $k_a$; otherwise Device produces a message indistinguishable (without $k_a$) from a valid one.

Asset modification may be facilitated by re-provisioning. Upon provisioning of an asset with an asset id which is already being used, the new asset replaces the old one. Asset removal may be performed by provisioning an asset with a null payload and a deletion flag. The asset id of the null asset corresponds to the asset that shall be removed.

Assets are provisioned into the device so they may be used or consumed by components or modules on the device. In a demonstrative implementation, assets are consumed only by being read.

In the asset obtainment processes, the contents of assets are provided to subjects in response to an API call. In regular cases, the API call may return the actual asset. For feature activation assets, the system may provide the asset value directly to the relevant hardware module, and the API call may only indicate success or failure.

A calling application that attempts to use the API is required to provide the asset id identifying the sought asset. In return, the system returns the payload of the required asset (unless the asset is a feature activation that was directly pushed to the hardware). On failure, the API returns a code that indicates one of the following error conditions: (1) "Not found", indicating that there is no asset in the secure storage that carries the specified asset id; (2) "Unauthorized", indicating that the credentials provided are not sufficient to grant access to the asset; (3) "Failure", indicating that another failure occurred, such as when checking the integrity of the secure storage, which prevents the asset from being made available.

Each asset metadata contains a permission field which indicates what entities are permitted to access the asset. In a demonstrative implementation, the system may not support multiple permission levels. Specifically, it provides entities on the device with read access only. Assets may be read, but cannot be modified or even deleted by on-device consumers. Asset deletion is supported only through the provisioning mechanism itself, i.e., with the help of an authorized Provisioning Server.

The permission field may support the following subjects: "All", "TEE", "Specific-TEE", and "Specific-HLOS".

The subject "ALL" indicates all code on the device. The asset will be freely available to any application, either running on the TEE (Trusted Execution Environment) or running on the HLOS (High Level Operating System) that runs on the device.

The subject "TEE" indicates all TEE code on the device. The asset will be available to all functions running in the TEE of the device.

The subject "Specific-TEE" indicates a specific TEE function. The asset will be available to one or more positively identified TEE functions on the device. The Secure OS is responsible for determining and reporting the caller identity to the code implementing the invention for this restriction to be enforced.

The subject "Specific-HLOS" indicates a specific HLOS function. The asset will be available to one or more positively identified HLOS applications on the device. The HLOS application may identify itself using a challenge-response protocol, where the secret value required for responding to the challenges is embedded in an HLOS shared library. This HLOS shared library may use data obfuscation techniques to protect the challenge-response secret and shall verify the calling application's identity using code integrity verification.

Some embodiments may enable Ticketing and authorized provisioning. For example, in some implementations, a Provisioning Server operator may be required to acquire an authorization ticket from the Authorization Server in order to provision assets. In such cases, the Provisioning Server certificate issued to this Provisioning Server will include a flag indicating that this Provisioning Server must present a valid authorization ticket with provisioning events.

A Provisioning Server required to present an a authorization ticket must first obtain such tickets issued for its assets. In order to perform this ticket issuance, the Provisioning Server may contact the Authorization Server and present its own Provisioning Server certificate and a hash digest computed over an asset. The Authorization Server may log the transaction (for subsequent billing purposes), and may issue an authorization ticket containing a signature on the asset hash. The signature is computed using a ticket signing key which is signed by the Authorization RoT. The ticket will then be verified by receiving devices as a condition to their storing this asset.

In order to authorize delegation records, the Delegation Server may send the public key of the delegated server (not its hash) to the Authorization Server. The Authorization Server may issue an authorization ticket by signing this public key.

In order to minimize the number of ticketing transactions, the system may issue a single authorization ticket covering multiple assets. For example, the Provisioning Server may build a Merkle tree containing all the assets as leaves, and request a ticket for the tree's top hash. The ticket request, and the resulting ticket, should indicate the tree size, which should be a power of 2. When the Provisioning Server then presents the ticket to the Device, it will also present a minimal subset of the nodes to permit the device to reconstruct the Merkle tree and verify that the top hash matches that stated in the ticket.

Figure 7A:
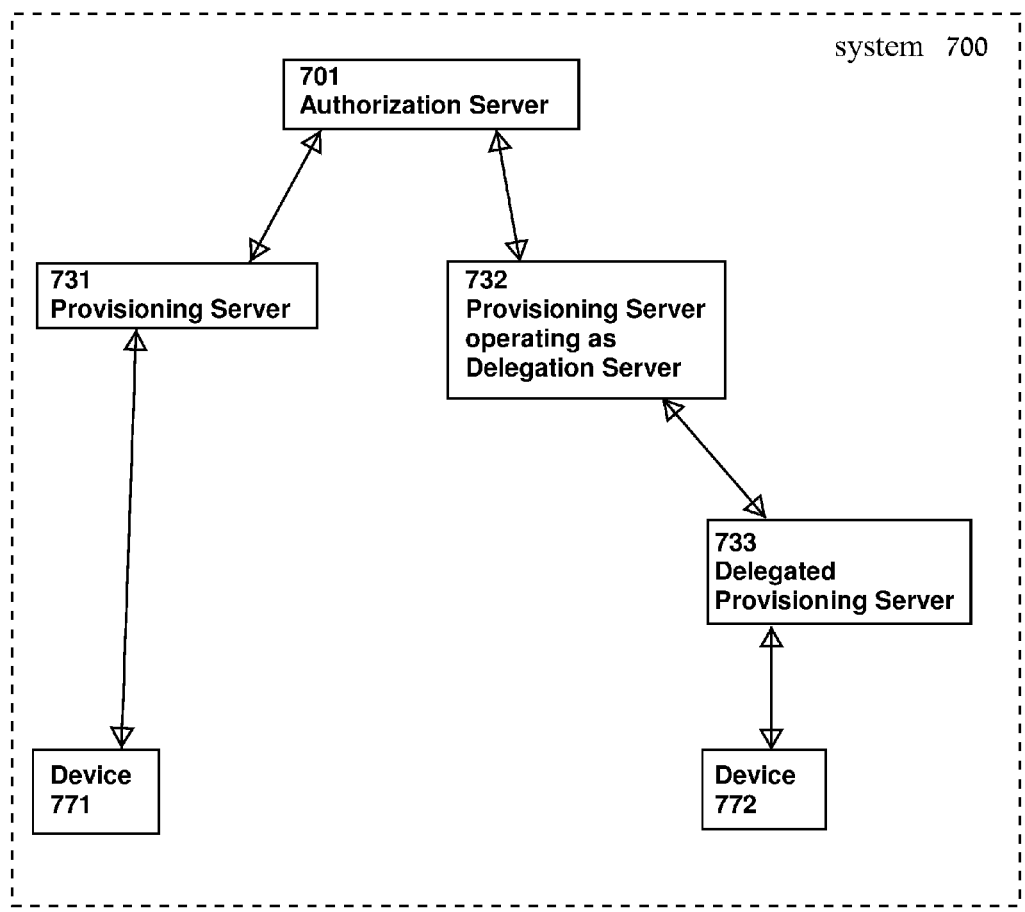
FIGS. 7A-7E are schematic block-diagram illustrations of a system and its components, in accordance with some demonstrative embodiments of the present invention.

Reference is made to FIGS. 7A-7E, which are schematic block-diagram illustrations of a system 700 and its components, in accordance with some demonstrative embodiments of the present invention. FIG. 7A shows a demonstrative implementation of system 700, which may comprise: an authorization server 701, provisioning servers 731-733, and electronic devices 771-772. Components of system 700 may be able to communicate with each other, directly and/or indirectly, via one or more wired and/or wireless communication links, via Local Area Network (LAN), via Wide Area Network (WAN), via TCP/IP or Internet connection(s), or the like.

It is noted that the units or components of FIGS. 7A-7E may comprise other suitable modules or sub-units, in order to perform or implement one or more of the operations or functionalities or protocols described herein. For example, an Identification Module may perform the operations associated with Identification; an Enrollment Module may perform the operations associated with Enrollment; a Provisioning Module may perform the operations associated with Provisioning; a Delegation Module may perform the operations associated with Delegation; a Querying Module may perform the operations associated with Querying; and so forth. Such modules may be server-side, may be client-side or device-side, or may be implemented on a provisioning server and/or delegation server and/or the authorization server and/or the electronic device(s).

Provisioning server 731 may provision asset(s) to device 771.

Provisioning server 732 may have right(s) to provision asset(s) to device 772. Provisioning server 732 may operate as a Delegation Server; and may delegate some or all of its provisioning rights to "target" or "delegated" provisioning server 733. The delegated provisioning server 733, in turn, may provision asset(s) to device 772, in strict accordance with the provisioning right(s) as previously delegated by Delegation Server 732 to delegated Provisioning Server 733.

In accordance with the present invention, Delegation Server 732 may not reveal the asset(s) that were actually provisioned by the delegated Provisioning Server 733 to device 772; even if Delegation Server 732 has access to all the communications that take place within system 700.

In accordance with the present invention, Delegation Server 732 may operate as an "introducing" server, and may "introduce" the delegated Provisioning Server 733 to device 772. Upon such "introduction" (or, delegation of provisioning rights), the delegated Provisioning Server 733 may send an encrypted asset (X) to device 772; and the Delegation Server 732 is not capable of deciphering or decrypting the encrypted asset (X), even though the Delegation Server 732 was the entity that "introduced" the delegated Provisioning Server 733 to device 772 in the first place, and even though the Delegation Server 732 may be able to listen on all the communications among components of system 700.

Figure 7B:
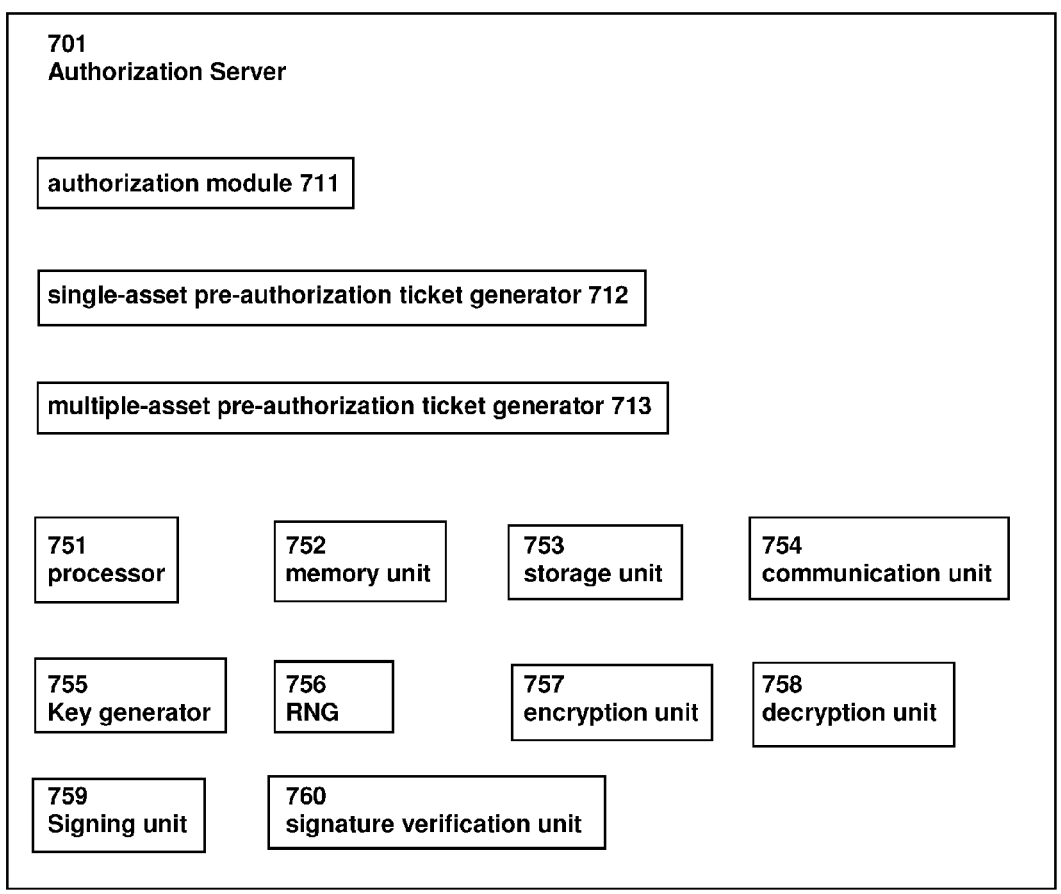

FIG. 7B is a more detailed block-diagram illustration of a demonstrative implementation of Authorization Server 701.

Figure 7C:
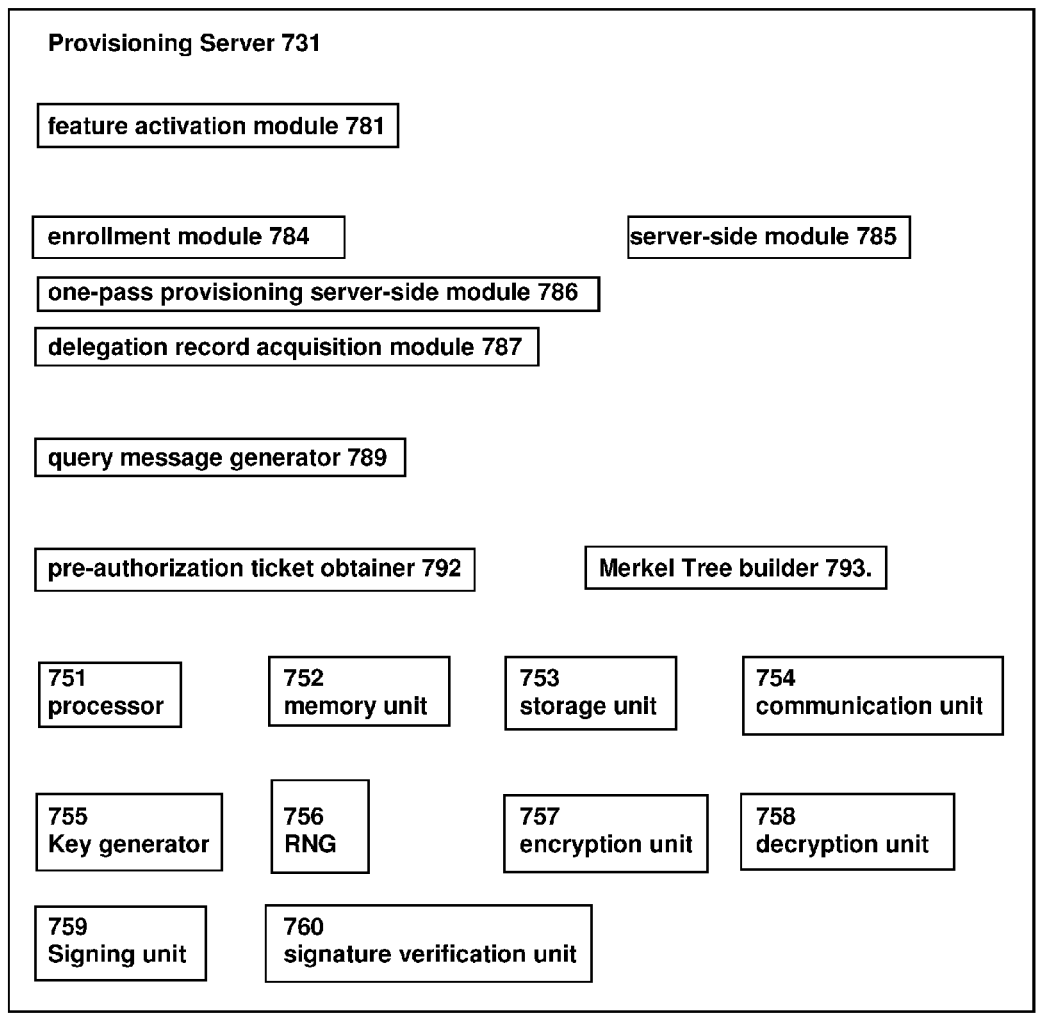

FIG. 7C is a block-diagram illustration of a demonstrative implementation of Provisioning Server 731.

Figure 7D:
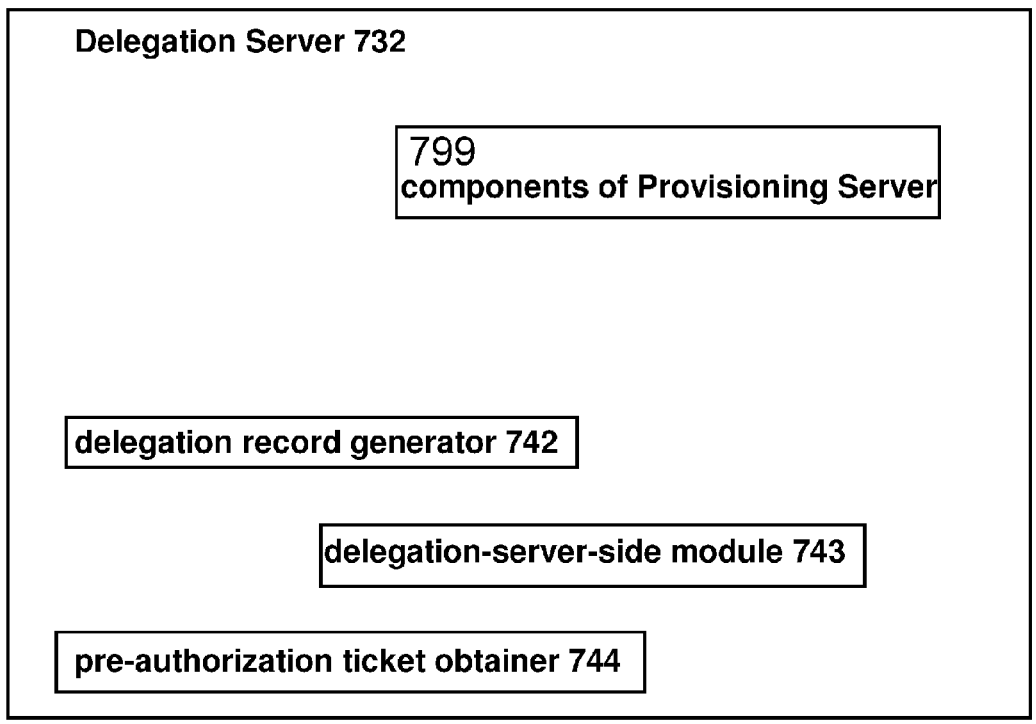

FIG. 7D is a block-diagram illustration of a demonstrative implementation of Delegation Server 732.

Figure 7E:
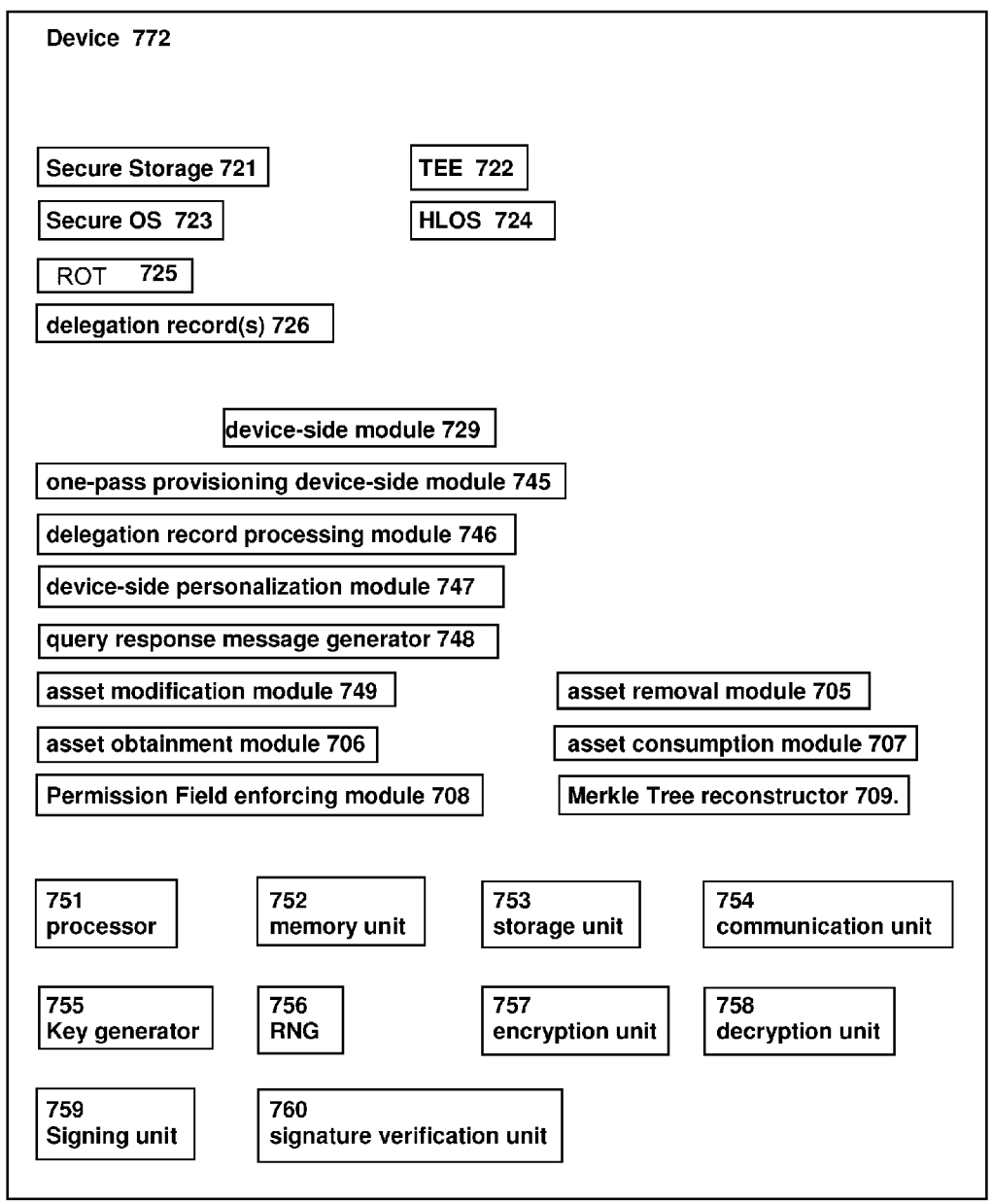

FIG. 7E is a block-diagram illustration of a demonstrative implementation of device 772.

Each one of the units shown in FIG. 7A may comprise, for example: a processor 751 able to execute code or programs or applications; a memory unit 752; a storage unit 753; a wired or wireless communication unit 754 (e.g., transmitter, receiver, transceiver, Network Interface Card (NIC), modem, or the like); a key generator 755 able to generate keys, symmetric keys, asymmetric keys, private keys, public keys, encryption keys, decryption keys, key-pair(s), or the like; a Random Number Generator (RNG) 756 able to generate random or pseudo-random numbers which may be used by other sub-units or modules (e.g., by key generator 755); an encryption unit 757 or encryption module; a decryption unit 758 of decryption module; a signing unit 759 or signing module; a signature verification unit 760 or signature verification module; and other suitable hardware components and/or software modules.

It is noted that for demonstrative purposes, and in order to not obscure the invention with excessive amount of components and unique numerals, the various units or modules that are mentioned in this paragraph are shown in FIGS. 7A-7E as having repeating numerals, even though each of them may be implemented differently across different units of system 700; for example, the processor is shown as processor 751 all across FIGS. 7B-7E, even though the Authorization Server 701 may comprise a first type of processor, the Provisioning Server 731 may comprise a second (different) type of processor, device 772 may comprise a third (different) type of processor, and so forth.

Turning to FIG. 7B, the Authorization Server 701 may further comprise, for example: an authorization module 711; a single-asset pre-authorization ticket generator 712; and a multiple-asset pre-authorization ticket generator 713.

Turning to FIG. 7C, the Provisioning Server 731 may further comprise, for example: a feature activation module 781; an enrollment module 784; a server-side module 785 able to perform one or more operations as a provisioning server towards the device(s), or other operations or functionalities described herein in relation to the server side; a one-pass provisioning server-side module 786; a delegation record acquisition module 787; a query message generator 789; a pre-authorization ticket obtainer 792; and a Merkel Tree builder 793.

Turning to FIG. 7D, the Delegation Server 732 may comprise components 799 which may include some or all of the components of Provisioning Server 731; and may further comprise, for example: a delegation record generator 742; a delegation-server-side module 743; and a pre-authorization ticket obtainer 744.

Turning to FIG. 7E, device 772 may further comprise, for example: a Secure Storage 721; a Trusted Execution Environment (TEE) 722; a Secure Operating System (Secure OS) 723; a High-Level Operating System (HLOS) 724; one or more Root of Trust (RoT) elements 725; one or more delegation record(s) 726; a device-side module 729 able to implement or perform one or more of the functionalities described herein in relation to device-side operations; a one-pass provisioning device-side module 745; a delegation record processing module 746; a device-side personalization module 747; a query response message generator 748; an asset modification module 749; an asset removal module 705; an asset obtainment module 706; an asset consumption module 707; a Permission Field enforcing module 708; and a Merkle Tree reconstructor 709.

Portions of the discussion herein may describe, for demonstrative purposes, secure and/or controlled provisioning of cryptographic assets (e.g., encryption key, decryption key, cryptographic key, password, Personal Identification Number (PIN), pass-phrase); however, the present invention may be utilized for, or in conjunction with, secure and/or controlled provisioning of other types of assets, for example, non-cryptographic assets, licenses, activation codes, Digital Rights Management (DRM) items or DRM-related items, or the like.

Discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The term "cryptographic operation" as used herein may include, for example, encoding, decoding, signing, authenticating, hashing, and/or performing other suitable operations related to cryptography and/or data security. For example, a "cryptographic operations module" or a "crypto-token module" may include an encoding module and/or a decoding module and/or other suitable modules or units.

Some embodiments may be implemented by using a suitable combination of hardware components and/or software modules, which may include, for example: a processor, a central processing unit (CPU), a digital signal processor (DSP), a single-core or multiple-core processor, a processing core, an Integrated Circuit (IC), a logic unit, a controller, buffers, accumulators, registers, memory units, storage units, input units (e.g., keyboard, keypad, touch-screen, stylus, physical buttons, microphone, on-screen interface), output units (e.g., screen, touch-screen, display unit, speakers, earphones), wired and/or wireless transceivers, wired and/or wireless communication links or networks (e.g., in accordance with IEEE 802.11 and/or IEEE 802.16 and/or other communication standards or protocols), network elements (e.g., network interface card (NIC), network adapter, modem, router, hub, switch), power source, Operating System (OS), drivers, applications, and/or other suitable components.

Some embodiments may be implemented as an article or storage article (e.g., CD or DVD or "cloud"-based remote storage), which may store code or instructions or programs that, when executed by a computer or computing device or machine, cause such machine to perform a method in accordance with the invention.

Some embodiments may be implemented by using a software application or "app" or a "widget" which may be downloaded or purchased or obtained from a website or from an application store (or "app store" or an online marketplace).

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method of cryptographic material provisioning (CMP), the method comprising:
   (a) generating a delegation message at a first provisioning server apparatus,
       wherein the delegation message indicates provisioning rights that are delegated by the first provisioning server apparatus to a second provisioning server apparatus with regard to subsequent provisioning of cryptographic assets to an electronic device,
       wherein generating the delegation message comprises at least one of:
       (A) inserting into the delegation message an encrypted association key that was encrypted by the second provisioning server apparatus using a public key of said electronic device, wherein said public key of said electronic device is usable to encrypt data for subsequent decrypting by said electronic device using said private encryption key of said electronic device;
       (B) inserting into the delegation message a public key of the second provisioning server apparatus, enabling the electronic device to locally generate said association key unknown to the first provisioning server apparatus; wherein the association key is retrievable by the second provisioning server apparatus based on the public key of the second provisioning server apparatus;
   (b) delivering the delegation message from the first provisioning server apparatus to the electronic device;
   (c) at the second provisioning server apparatus, provisioning one or more cryptographic assets to the electronic device, using said association key;
   wherein generating the delegation message comprises:
   inserting into the delegation message a public key of the second provisioning server apparatus, to enable execution of an identification protocol for subsequent personalized provisioning of a cryptographic asset to said electronic device.

2. A method of cryptographic material provisioning (CMP), the method comprising:
   (a) generating a delegation message at a first provisioning server apparatus,
       wherein the delegation message indicates provisioning rights that are delegated by the first provisioning server apparatus to a second provisioning server apparatus with regard to subsequent provisioning of cryptographic assets to an electronic device,
       wherein generating the delegation message comprises at least one of:
       (A) inserting into the delegation message an encrypted association key that was encrypted by the second provisioning server apparatus using a public key of said electronic device, wherein said public key of said electronic device is usable to encrypt data for subsequent decrypting by said electronic device using said private encryption key of said electronic device;
       (B) inserting into the delegation message a public key of the second provisioning server apparatus, enabling the electronic device to locally generate said association key unknown to the first provisioning server apparatus; wherein the association key is retrievable by the second provisioning server apparatus based on the public key of the second provisioning server apparatus;

(b) delivering the delegation message from the first provisioning server apparatus to the electronic device;

(c) at the second provisioning server apparatus, provisioning one or more cryptographic assets to the electronic device, using said association key;

wherein generating the delegation message comprises:
inserting into the delegation message one or more flags indicating to the electronic device whether the second provisioning server apparatus is authorized to provision: (X) only personalized cryptographic assets, or (Y) only class-wide cryptographic assets for a class of multiple electronic devices, or (Z) both personalized and class-wide cryptographic assets.

3. A method of cryptographic material provisioning (CMP), the method comprising:

(a) generating a delegation message at a first provisioning server apparatus,
wherein the delegation message indicates provisioning rights that are delegated by the first provisioning server apparatus to a second provisioning server apparatus with regard to subsequent provisioning of cryptographic assets to an electronic device,
wherein generating the delegation message comprises at least one of:
(A) inserting into the delegation message an encrypted association key that was encrypted by the second provisioning server apparatus using a public key of said electronic device, wherein said public key of said electronic device is usable to encrypt data for subsequent decrypting by said electronic device using said private encryption key of said electronic device;
(B) inserting into the delegation message a public key of the second provisioning server apparatus, enabling the electronic device to locally generate said association key unknown to the first provisioning server apparatus; wherein the association key is retrievable by the second provisioning server apparatus based on the public key of the second provisioning server apparatus;

(b) delivering the delegation message from the first provisioning server apparatus to the electronic device;

(c) at the second provisioning server apparatus, provisioning one or more cryptographic assets to the electronic device, using said association key;
prior to provisioning a particular cryptographic asset from the second provisioning server apparatus to the electronic device, performing:
acquiring by the second provisioning server apparatus an authorization ticket, from an authorization server apparatus, indicating that the second provisioning server apparatus is authorized to provision the particular cryptographic asset to said electronic device.

4. The method of claim 3, wherein said acquiring of the authorization ticket is triggered by a flag, indicating that authorization is required for each provisioning event performed by the second provisioning server apparatus, wherein the flag is located in a server certificate issued by said authorization server apparatus to the second provisioning server apparatus.

5. The method of claim 3, wherein the acquiring comprises:
at the second provisioning server apparatus, contacting the authorization server apparatus to present to the authorization server apparatus (A) a server certificate of the second provisioning server apparatus, and (B) a hash of the particular cryptographic asset intended to be provisioned by the second provisioning server apparatus to the electronic device.

6. The method of claim 5, wherein the acquiring further comprises:
receiving at the second provisioning server apparatus, from said authorization server apparatus, said authorization ticket which comprises a digital signature by the authorization server apparatus on the hash of the particular cryptographic asset intended to be provisioned by the second provisioning server apparatus to the electronic device;
wherein said digital signature enables said electronic device to verify said particular cryptographic asset prior to storing said particular cryptographic asset.

* * * * *